US00RE48009E

(19) United States
(12) Reissued Patent
Loftin et al.

(10) Patent Number: US RE48,009 E
(45) Date of Reissued Patent: May 26, 2020

(54) CARTON AND CARTON BLANK

(71) Applicant: WestRock Packaging Systems, LLC, Norcross, GA (US)

(72) Inventors: Caleb S. Loftin, Richmond, VA (US); Gregory P. Hayter, Richmond, VA (US); Andrew T. Peeler, Henrico, VA (US); Tanuja A. Patwardhan, Richmond, VA (US); John T. Hargrove, Midlothian, VA (US)

(73) Assignee: WestRock Packaging Systems, LLC, Atlanta, GA (US)

(21) Appl. No.: 15/922,382

(22) Filed: Mar. 15, 2018

Related U.S. Patent Documents

Reissue of:
(64) Patent No.: 9,630,738
Issued: Apr. 25, 2017
Appl. No.: 14/883,957
Filed: Oct. 15, 2015

U.S. Applications:
(60) Provisional application No. 62/064,374, filed on Oct. 15, 2014, provisional application No. 62/190,379,
(Continued)

(51) Int. Cl.
*B65D 5/42* (2006.01)
*B65D 5/02* (2006.01)
(Continued)

(52) U.S. Cl.
CPC ..... *B65D 5/4208* (2013.01); *B65D 5/0227* (2013.01); *B65D 5/4266* (2013.01); *B65D 71/36* (2013.01)

(58) Field of Classification Search
CPC .. B65D 5/4208; B65D 5/0227; B65D 5/4266; B65D 5/46; B65D 257/00469; B65D 257/00462
(Continued)

(56) References Cited

U.S. PATENT DOCUMENTS 2,802,616 A 8/1957 Caster et al.
5,186,542 A * 2/1993 Seabold ..... B65D 5/46016 229/117.26
(Continued)

FOREIGN PATENT DOCUMENTS

EP 0770022 B2 2/1997
EP 0770022 B2 6/2002
(Continued)

OTHER PUBLICATIONS

International Search Report for PCT/U82015/055666 dated Mar. 16, 2016.

*Primary Examiner* — Beverly M Flanagan
(74) *Attorney, Agent, or Firm* — WestRock Intellectual Property Group

(57) ABSTRACT

A carton for packaging one or more articles includes a plurality of walls including a top wall, a base wall, a first side wall and a second side wall forming a tubular structure. One of the plurality of walls includes a handle structure defined in it. The handle structure includes a grip member struck from one of the plurality of walls and a handle strap. The grip member is mounted on the handle strap. A first aperture is struck from the one of the plurality of walls. The aperture is disposed adjacent to a first end of the grip member so as to define a first end edge of the grip member. The first aperture defines a portion of an opening in the one of the plurality of walls. In the opening, a portion of the handle strap may be received.

29 Claims, 27 Drawing Sheets

Related U.S. Application Data filed on Jul. 9, 2015, provisional application No. 62/198,829, filed on Jul. 30, 2015.

(51) Int. Cl.
*B65D 71/36* (2006.01)
*B65D 5/46* (2006.01)

(58) Field of Classification Search
USPC ..... 229/117.09, 117.12, 117.13, 117.15
See application file for complete search history.

(56) References Cited

U.S. PATENT DOCUMENTS

| | | | | |
|---|---|---|---|---|
| 5,639,017 | A * | 6/1997 | Fogle | B65D 5/46192 229/117.13 |
| 6,905,066 | B2 | 6/2005 | Holley, Jr. et al. | |
| 6,926,193 | B2 | 8/2005 | Smalley | |
| 7,278,538 | B2 | 10/2007 | Chargueraud | |
| 2003/0006158 | A1 | 1/2003 | Skolik et al. | |
| 2003/0080180 | A1 | 5/2003 | Holley | |
| 2005/0167476 | A1 | 8/2005 | Ikeda | |
| 2007/0029371 | A1 | 2/2007 | Theelen | |

FOREIGN PATENT DOCUMENTS

| | | | |
|---|---|---|---|
| EP | 1144261 | B1 | 6/2003 |
| EP | 11442611 | B1 | 6/2003 |
| EP | 1242287 | B1 | 11/2004 |
| EP | 2025607 | B1 | 2/2009 |
| EP | 2025607 | B1 | 1/2013 |
| WO | WO96/27568 | | 9/1996 |
| WO | WO02/36440 | A2 | 5/2002 |
| WO | WO 2005/123532 | A1 | 12/2005 |
| WO | WO 2012-142559 | A1 | 10/2012 |

* cited by examiner

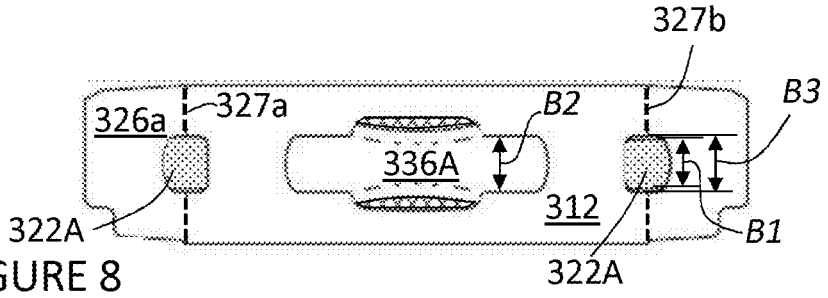
FIGURE 8
FIGURE 9
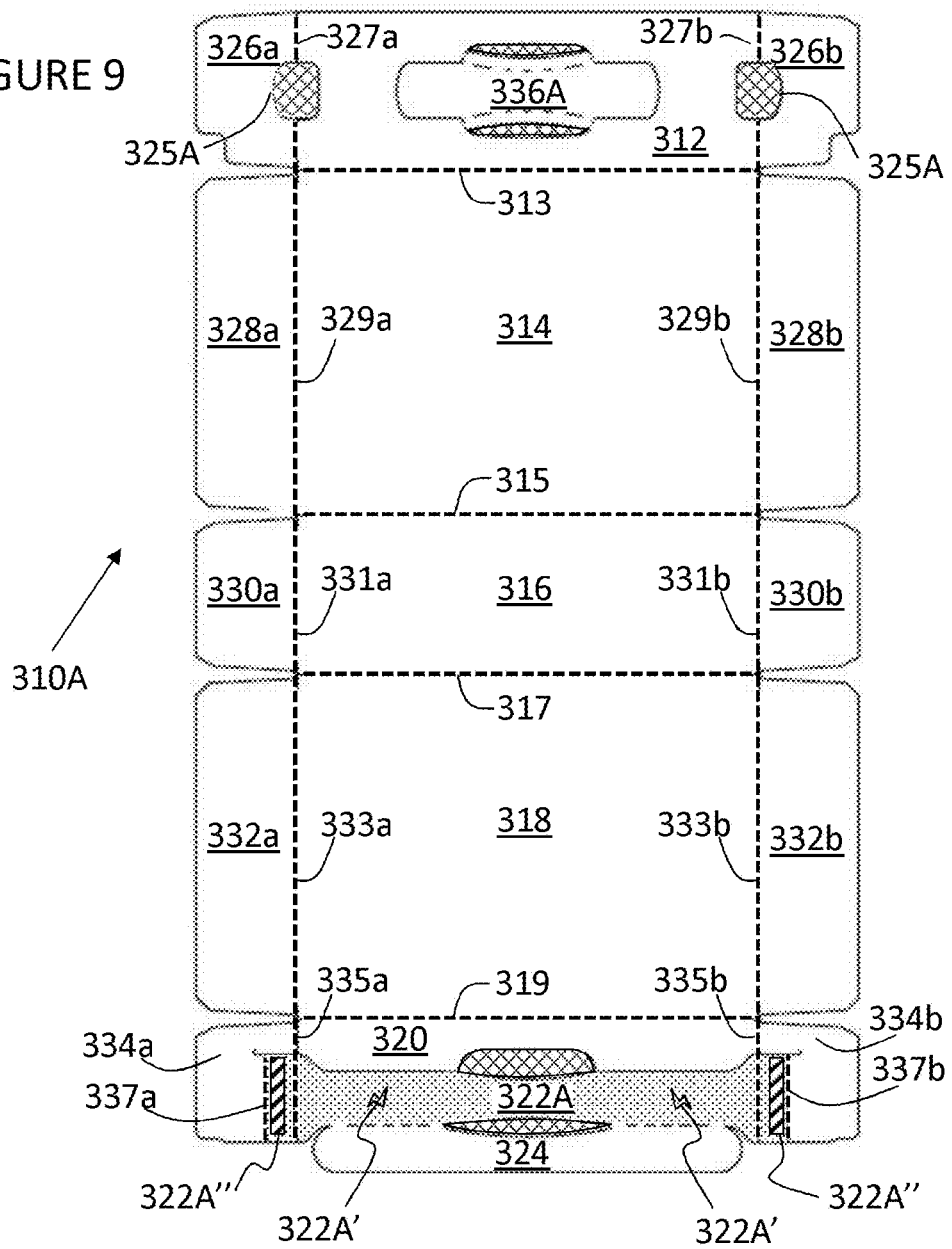

310C

310D

CARTON AND CARTON BLANK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

REFERENCE TO RELATED APPLICATIONS

This application claims the benefit of priority under 35 U.S.C. § 119(e) of U.S. provisional applications Ser. No. 62/064,374 filed on Oct. 15, 2014, Ser. No. 62/190,379 filed on Jul. 9, 2015, and Ser. No. 62/198,829 filed on Jul. 30, 2015, all of which are hereby incorporated by reference in their respective entireties.

TECHNICAL FIELD

The present invention relates to a carton and to a blank for forming the carton more specifically, but not exclusively, to a carton having a carrying handle for carrying the carton.

BACKGROUND

In the field of packaging it is often required to provide consumers with a package comprising multiple primary product containers. Such multi-packs are desirable for shipping and distribution and for display of promotional information. For cost and environmental considerations, such cartons or carriers need to be formed from as little material as possible and cause as little wastage in the materials from which they are formed as possible. Another consideration is the strength of the packaging and its suitability for holding and transporting large weights of articles.

It is desirable to provide a carton with a carrying handle for transportation by a consumer. It is desirable that the carrying handle allows the carton to be stacked, and can be deployed so as to be readily accessed by the consumer.

The present invention seeks to overcome or at least mitigate the problems of the prior art.

SUMMARY

According to a first aspect of the present invention there is provided a handle structure for a carton. The handle structure comprises a grip member struck from a panel forming a carton wall and a handle strap disposed below the panel. The grip member is mounted on the handle strap. An aperture is struck from the panel adjacent to an end of the grip member so as to define an end edge of the grip member. The aperture defines a portion of an opening in the panel in which opening a portion of the handle strap is receivable.

Optionally, the aperture is greater in width than the adjacent portion of the grip member.

In some embodiments, the grip member comprises a cushioning flap hinged along a side edge thereof.

Optionally, the cushioning flap is severably coupled to the panel forming the carton wall.

The handle structure may further comprise a handle reinforcing panel hingedly connected to the handle strap by a fold line.

Optionally, the handle reinforcing panel comprises rounded end edges.

In some embodiments, the handle reinforcing panel comprises arcuate end edges.

Optionally, the handle reinforcing panel comprises end portions which are severably coupled to the handle strap.

The handle reinforcing panel may comprise first and second end portions each of which may be separated from the handle strap by a cutaway.

Optionally, each cutaway defines an arcuate end edge of the handle reinforcing panel.

According to a second aspect of the present invention there is provided a carton for packaging one or more articles. The carton comprises a plurality of walls including a top wall, a base wall, a first side wall and a second side wall forming a tubular structure. One of the plurality of walls may include a handle structure defined therein. The handle structure may include a grip member struck from one of the plurality of walls and a handle strap. The grip member may be mounted on the handle strap. A first aperture may be struck from said one of the plurality of walls. The aperture may be disposed adjacent to a first end of the grip member so as to define a first end edge of the grip member. The first aperture defines a portion of an opening in the one of the plurality of walls. In the opening, a portion of the handle strap is receivable.

Optionally, said one of the plurality of walls is formed from a first panel and a second panel to form a two ply structure, wherein the grip member is struck from an outer ply and the handle strap is struck from an inner ply.

In some embodiments, the inner ply comprises a second aperture adjacent to a side edge of the handle strap and is arranged to be in vertical registry with the first aperture.

A third aperture may be struck from said one of the plurality of walls; the third aperture may be disposed adjacent to a second end of the grip member so as to define a second end edge of the grip member. The third aperture defines a portion of an opening in said one of the plurality of walls in which opening a portion of the handle strap is receivable.

Optionally, said one of the plurality of walls is formed from a first panel and a second panel to form a two ply structure, wherein the grip member is struck from an outer ply and the handle strap is struck from an inner ply, the inner ply comprising a fourth aperture adjacent to a side edge of the handle strap and arranged to be in vertical registry with the third aperture.

According to a third aspect of the present invention there is provided a blank for forming a carton. The blank may comprise a plurality of panels including a first top panel, a base panel, a first side panel and a second side panel. One of the plurality of panels may include a handle structure defined therein. The handle structure may include a grip member struck from the top panel. A first aperture may be struck from the first top panel. The aperture may be disposed adjacent to a first end of the grip member so as to define a first end edge of the grip member. The first aperture and the grip member define at least in part an opening in the first top panel.

The blank may comprise a second top panel for forming a composite top wall of a carton with the first top panel. The handle structure may comprise a handle strap struck from the second top panel.

The blank may comprise a handle reinforcing panel for forming a two ply strap member, wherein the handle reinforcing panel is hingedly connected to the handle strap.

According to a fourth aspect of the present invention there is provided a carton for packaging one or more articles. The carton may comprise a plurality of walls including a composite wall formed from a first outer panel and a second inner panel, the carton including a handle structure defined therein. The handle structure may include a handle strap struck from the second inner panel and a handle reinforcing panel hingedly connected to the handle strap folded to form a two ply strap member. An opening may be defined in the first outer panel, in which opening a portion of the strap member is receivable. The handle reinforcing panel may comprise arcuate end edges.

Optionally, the arcuate end edges are defined by arcuate cut lines.

Alternatively, the arcuate end edges are defined by arcuate severance lines.

Alternatively, the arcuate end edges are defined by arcuate cutaways.

According to a fifth aspect of the present invention there is provided a carton for packaging one or more articles. The carton may comprise a plurality of walls including a top wall, a base wall, a first side wall and a second side wall forming a tubular structure. One of the plurality of walls includes a handle structure defined therein. The handle structure may include a handle strap, a grip member struck from one of the plurality of walls and mounted on the handle strap, and a cushioning flap hingedly coupled to the grip member and severably coupled to said one of the plurality of walls. The grip member and the cushioning flap may define at least in part an opening in said one of the plurality of walls in which opening a portion of the handle strap is receivable.

According to a fifth aspect of the present invention there is provided a blank for forming a carton. The blank may comprise a plurality of panels including a first outer top panel for forming a composite top panel and a second inner top panel for forming a composite top panel. The blank may comprise a handle structure including a handle strap struck from the second inner top panel and a handle reinforcing panel comprising arcuate end edges and hingedly connected to the handle strap foldable to form a two ply strap member. An opening may be defined in the first outer top panel, in which opening a portion of the strap member is receivable.

According to a sixth aspect of the present invention there is provided a blank for forming a carton. The blank may comprise a plurality of panels including a first top panel, a base panel, a first side panel and a second side panel, one of the plurality of panels including a handle structure defined therein. The handle structure may include a handle strap, a grip member struck from one of the plurality of panels and mounted on the handle strap, and a cushioning flap hingedly coupled to the grip member and severably coupled to said one of the plurality of panels. The grip member and the cushioning flap may define at least in part an opening in said one of the plurality of panels in which opening a portion of the handle strap is receivable.

According to additional aspects of the invention, openings may be provided in the container adjacent or proximate the handle in order to make evident the presence of reinforcing or extending portions of the handle within the carton.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which:

FIG. 8 is a view of the top panels of a fourth embodiment of a carton;

FIG. 9 is a plan view from above of a blank for forming the carton of FIG. 8;

DETAILED DESCRIPTION OF EMBODIMENTS

Detailed descriptions of specific embodiments of the package, blanks and cartons are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the packages, blanks and cartons described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

In the examples herein, the handle structure is formed in a top wall of a carton. However, it should be understood that the handle structure may be formed in a wall or walls other than the top wall.

Figure 1:
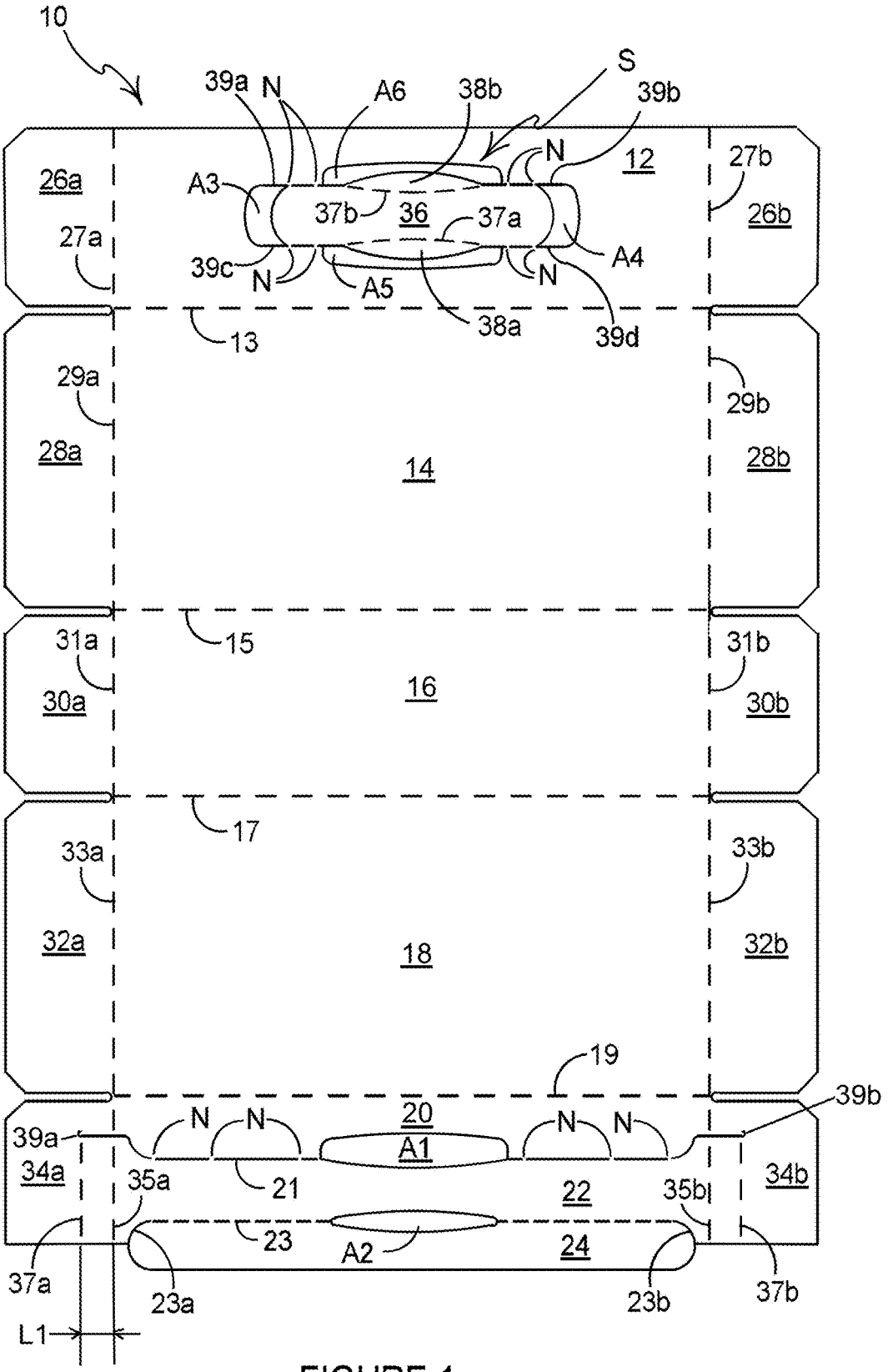
FIG. 1 is a plan view from above of a blank for forming a carton according to a first embodiment.
Figure 2:
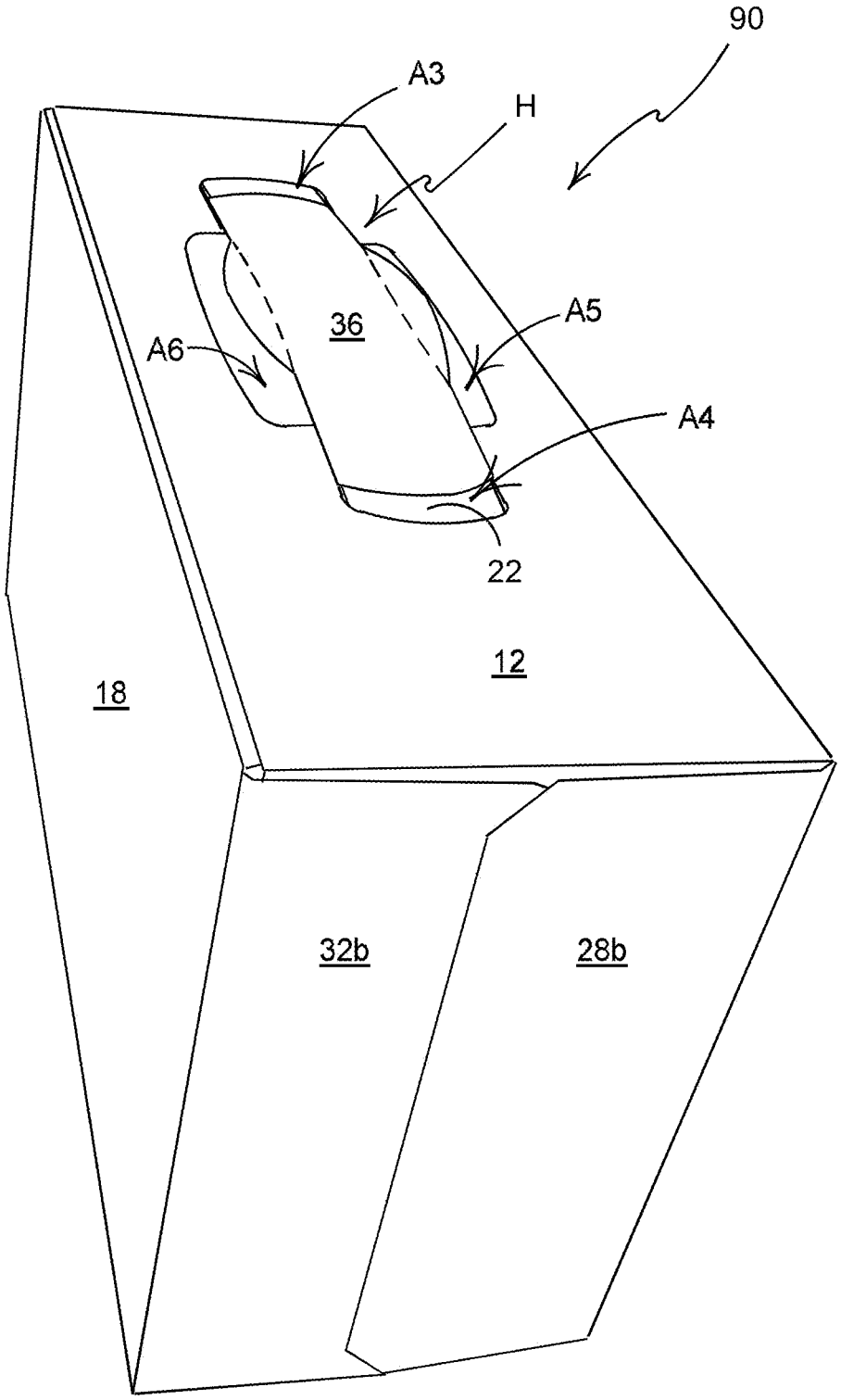
FIG. 2 is a perspective view from above of a carton formed from the blank of FIG. 1.

Referring to FIG. 1, there is shown a plan view of a blank 10 capable of forming a carton 90 having a carrying handle H, as shown in FIG. 2, for primary products such as, but not limited to, cans, bottles or any other substantially cylindrical articles, hereinafter referred to as articles C.

In the embodiments detailed herein, the terms "carton" and "carrier" refer, for the non-limiting purpose of illustrating the various features of the invention, to a container for engaging, carrying, and/or dispensing articles, such as product containers. It is contemplated that the teachings of the invention can be applied to various product containers, which may or may not be tapered and/or cylindrical. Exemplary containers include bottles (for example metallic, glass or plastics bottles), cans (for example aluminium cans), tins, pouches, packets and the like.

The blanks 10, 110, 210 are formed from a sheet of suitable substrate. It is to be understood that, as used herein, the term "suitable substrate" includes all manner of foldable sheet material such as paperboard, corrugated board, cardboard, plastic, combinations thereof, and the like. It should be recognized that one or other numbers of blanks may be employed, where suitable, for example, to provide the carrier structure described in more detail below.

In the exemplary embodiments, the blanks 10, 110, 210 are configured to form a carton or carrier for packaging an exemplary arrangement of exemplary articles. In a first illustrated exemplary embodiment, the arrangement is a 3×5 matrix or array and the articles are bottles. Alternatively, the blanks 10, 110, 210 can be configured to form a carrier for packaging other types, number and size of article and/or for packaging articles in a different arrangement or configuration.

The blank 10 comprises a plurality of main panels 12, 14, 16, 18, 20 hinged one to the next in a linear series. The blank 10 comprises a first top panel 12 hinged to a first side panel 14 by a fold line 13. The first side panel 14 is hinged to a base panel 16 by a fold line 15. The base panel 16 is hinged to a second side panel 18 by a fold line 17. The second side panel 18 is hinged to a second top panel 20 by a fold line 19.

The plurality of main panels 12, 14, 16, 18, 20 of the blank 10 form the walls of an open ended tubular structure in a set up condition.

Each of the ends of the tubular structure is at least partially closed by end closure panels, which form end walls of the tubular structure. In the illustrated embodiment the ends of the tubular structure are fully closed by end closure panels 26a, 28a, 30a, 32a, 34a, 26b, 28b, 30b, 32b, 34b.

End closure panels 26a, 28a, 30a, 32a, 34a are configured to close a first end of the tubular structure and end panels 26b, 28b, 30b, 32b, 34b are configured to close a second end of the tubular structure.

A first end closure panel 26a is hinged to a first end of first top panel 12 by a fold line 27a. A second end closure panel 28a is hinged to a first end of first side panel 14 by a fold line 29a. A third end closure panel 30a is hinged to a first end of base panel 16 by a fold line 31a. A fourth end closure panel 32a is hinged to a first end of the second side panel 18 by a fold line 33a. A fifth end closure panel 34a is hinged to a first end of second top panel 20 by fold line 35a.

A sixth end closure panel 26b is hinged to a second end of first top panel 12 by a fold line 27b. A seventh end closure panel 28b is hinged to a second end of the first side panel 14 by a fold line 29b. An eighth end closure panel 30b is hinged to a second end of base panel 16 by a fold line 31b. A ninth end closure panel 32b is hinged to a second end of second side panel 18 by a fold line 33b. A tenth end closure panel 34b is hinged to a second end of second top panel 20 by a fold line 35b.

When the carton 90 is at rest upon the base panel 16, or when the carrying handle H is in use, the first end closure panel 26a along with the fifth end closure panel 34a form a minor upper end closure panel. The third end closure panel 30a forms a minor lower end closure panel. The second end closure panel 28a and the fourth end closure panel 32a each form a major side end closure panel. The sixth end closure panel 26b together with the tenth end closure panel 34b form a minor upper end closure panel. The eighth end closure panel 30b forms a minor lower end closure panel. The seventh end closure panel 28b and the ninth end closure panel 32b each form a major side end closure panel.

A handle strap 22 is struck from the second top panel 20. The handle strap 22 is defined in part by a severance line 21. The handle strap 22 is defined in part by an aperture A1. The severance line 21 extends longitudinally across the second top panel 20 and into each of the fifth and tenth end closure panels 34a, 34b. The severance line 21 terminates in each of the fifth and tenth end closure panels 34a, 34b with a "J" or "C" shaped cut line portion 39a, 39b. The handle strap 22 may be made wider as it approaches the fifth and tenth end closure panels 34a, 34b to provide added strength. The handle strap 22 is severably coupled to the second top panel 20 and can be detached therefrom. The length of each end segment of the severance line 21 between the respective terminating point (i.e., the respective J-shaped cut line portion) and the adjacent fold line 35a or 35b is denoted by "L1". The length L1 of each end segment is generally equal to, or greater than, a half of the diameter of each substantially cylindrical article received in the carton. Glue or any other adhesive may be applied to at least part of the outermost area of each of the fifth and tenth end closure panels 34a, 34b between the respective fold line 37a or 37b and the respective free end of that end closure panel 34a or 34b so that those outermost areas are secured to the inside surfaces of the first and sixth end closure panels 26a, 26b respectively. However, it is preferred that no adhesive is applied to the handle strap 22 at the area between the fold lines 37a and 37b other than to secure the handle strap 22 to a handle reinforcing panel 24. By such controlled glue application associated with the handle strap 22 as well as the controlled length L1 of the end segments of the severance line 21, the opposed end portions of the handle strap 22 can well conform to, and wraparound, the respective end cans C when the package is lifted by the handle strap 22. By that means, the chance of tear developing from the terminating points of the severance line 21 is considerably reduced.

The handle strap 22 is defined in part by a first fold line 37a provided in the fifth end closure panel 34a. The handle strap 22 is defined in part by a second fold line 37b provided in the tenth end closure panel 34b.

A handle reinforcing panel 24 is hinged to the handle strap 22 by a fold line 23. The handle reinforcing panel 24 may extend substantially along the entire length of the handle strap 22 at least up to the point where the handle strap 22 widens as it approaches the end closure panels 34a, 34b.

The blank 10 comprises a first cut line 23a at a first end of the fold line 23. First cut line 23a is arcuate in shape. The blank 10 comprises a second cut line 23b at a second end of the fold line 23. Second cut line 23b is arcuate in shape. The severance line 21 comprises corresponding arcuate portions which are divergently arranged with respect to an opposing one of the first or second linear cut lines 23a, 23b.

A first aperture A1 interrupts the severance line 21. A second aperture A2 interrupts the fold line 23. The first aperture A1 and the second aperture A2 define opposing side edges of the handle strap 22. The first and second apertures A1, A2 define a central grip portion of the handle strap 22.

The blank 10 comprises a handle structure S in the first top panel 12. The handle structure S comprises a grip panel forming a grip member 36 struck from the first top panel 12. Optionally, the grip member 36 comprises a first cushioning flap 38a hinged to a first side edge thereof by a fold line 37a. The grip member 36 comprises a second optional cushioning flap 38b hinged to a second side edge, opposing the first side edge, by a fold line 37b. A third aperture A3 defines a first end of the grip member 36. A fourth aperture A4 defines a second end of the grip member 36. A fifth aperture A5 defines a side edge of the first cushioning flap 38a and adjacent side edge portions of the grip member 36. A sixth aperture A6 defines a side edge of the second cushioning flap 38b and adjacent side edge portions of the grip member 36. The grip member 36 is severably coupled to the first top panel 12 by a first severance line 39a, second severance line 39b, third severance line 39c, and a fourth severance line 39d. Nick portions N connect the grip member 36 to the first top panel 12. The nick portions N are severable so as to allow the grip member 36 (and cushioning flaps 38a, 38b) to be detached from the first top panel 12.

Figure 3:
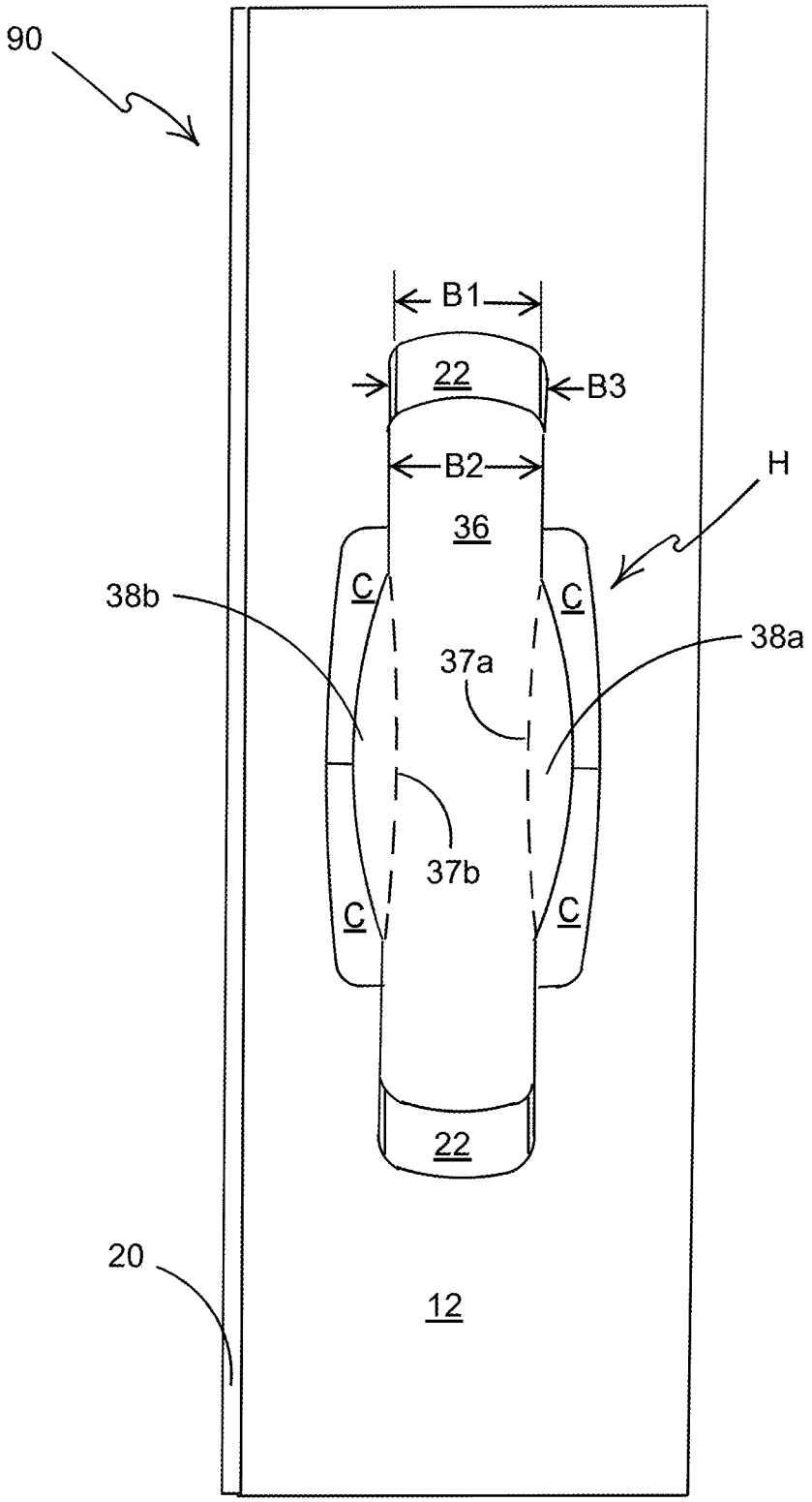
FIG. 3 is a top view of a carton formed from the blank of FIG. 1.

Turning to the construction of the carton 90 as illustrated in FIGS. 2 and 3, the carton 90 can be formed by a series of sequential folding operations in a straight line machine so that the carton 90 is not required to be rotated or inverted to complete its construction. The folding process is not limited to that described below and may be altered according to particular manufacturing requirements.

Glue or other adhesive treatment is applied to the handle reinforcing panel 24 or, in alternative embodiments, to a corresponding portion of the handle strap 22.

The blank 10 is folded about fold line 23 such that the handle reinforcing panel 24 is brought into face contacting relationship with the handle strap 22 and is secured thereto.

The blank 10 is folded about fold line 19 such that the second top panel 20 is brought into face contacting relationship with an inside surface of the second side panel 18.

Glue or other adhesive treatment is applied to the second top panel 20 or, in alternative embodiments, to a corresponding portion of the first top panel 12.

The blank 10 is folded about fold line 15, such that the first top panel 12 and the first side panel 14 are folded together thereabouts. The first side panel 14 is folded such that an inside surface is brought into face contacting relationship with an inside surface of the base panel 16 and the second side panel 18. The first top panel 12 is folded such that an inside surface is brought into face contacting relationship with an outer surface of the second top panel 20.

The first top panel 12 is secured to the second top panel 20. The first top panel 12 at least partially overlaps with the second top panel 20.

The first top panel 12 is secured to the second top panel 20 to form a composite top panel 12/20; in this way a flat collapsed carton is formed. The carton 90 may be shipped or distributed in this flat collapsed form.

In alternative embodiments the second top panel 20 may be secured to the first top panel 12 by alternative securing means for example, but not limited to, staples or other mechanical fixing means.

The flat collapsed carton may be erected into a tubular structure by separating the composite top panel 12/20 from the base panel 16.

The carton 90, in its open ended tubular form, may be loaded with articles C through one or both open ends. It will be appreciated that, in other embodiments, one of the open ends of the carton 90 may be closed before loading the carton 90 with articles C through the remaining open end. When the blank 10 is being loaded in a packaging machine, the flat collapsed form may be orientated in the packaging machine such that the second side panel 18 forms a base upon which the articles C may be loaded. The articles C may be slid into the tubular structure upon the second side panel 18 such that the cylindrical axes of the articles C are parallel to the fold lines 27a, 27b, 31a, 31b, 35a, 35b.

In some embodiments, some or all of the end closure panels 26a, 28a, 30a, 32a, 34a, 26b, 28b, 30b, 32b, 34b may be folded outwardly so as to create a funnel at the open end of the tubular structure for facilitating loading of the carton 90 with articles C.

Once the carton 90 is loaded with articles C the ends of the tubular structure are closed.

A first end of the tubular structure is closed by folding the first end closure panel 26a along with the fifth end closure panel 34a, the minor upper end closure panel, about fold lines 27a and 35a respectively. The third end closure panel 30a, the minor lower end closure panel, is folded about fold line 31a.

Glue or other adhesive treatment may be applied to an outer surface of the third end closure panel 30a or, in alternative embodiments, to a corresponding portion of an inner surface of the fourth end closure panel 32a.

Glue or other adhesive treatment may be applied to an outer surface of the first end closure panel 26a or, in alternative embodiments, to a corresponding portion of an inner surface of the second end closure panel 28a or fourth end closure panel 32a.

The fourth end closure panel 32a is then folded about the fold line 33a to be brought into contact with the first end closure panel 26a and into contact with the third end closure panel 30a and optionally secured thereto.

Glue or other adhesive treatment may be applied to an inner surface of the second end closure panel 28a or, in alternative embodiments, to a corresponding portion of an outer surface of the fourth end closure panel 32a.

The second end closure panel 28a is then folded about the fold line 29a to be brought into contact with the fourth end closure panel 32a. The second end closure panel 28a is secured to the fourth end closure panel 32a.

A second end of the tubular structure is closed by folding the sixth end closure panel 26b along with the tenth end closure panel 34b, the minor upper end closure panel, about fold lines 35b and 37b respectively.

The eighth end closure panel 30b, the minor lower end closure panel, is folded about fold line 31b.

Glue or other adhesive treatment may be applied to an outer surface of the eighth end closure panel 30b or, in alternative embodiments, to a corresponding portion of an inner surface of the ninth end closure panel 32b.

Glue or other adhesive treatment may be applied to an outer surface of the sixth end closure panel 26b or, in alternative embodiments, to a corresponding portion of an inner surface of the ninth end closure panel 32b.

The ninth end closure panel 32b is then folded about the fold line 33b to be brought into contact with the sixth end closure panel 26b and into contact with the eighth end closure panel 30b and optionally secured thereto.

Glue or other adhesive treatment may be applied to an inner surface of the seventh end closure panel 28b or, in alternative embodiments, to a corresponding portion of an outer surface of the ninth end closure panel 32b.

The seventh end closure panel 28b is then folded about the fold line 29b to be brought into contact with the ninth end closure panel 32b. The seventh end closure panel 28b is secured to the ninth end closure panel 32b.

FIGS. 2 and 3 illustrate the assembled carton 90 forming a package with a plurality of articles C.

The handle structure S can be deployed to form a carrying handle H by a consumer. The consumer can engage with the grip member 36 and a portion of the handle strap 22 disposed therebelow. The consumer severs the nick portions N connecting the grip member 36 to the first top panel 12. The grip member 36 and a part of the handle strap 22 are displaced outwardly of the carton 90 so as to facilitate carrying of the carton 90. The handle strap 22 is bowed upwardly so as to be convex when viewed from an external viewpoint. The end portions of the handle strap 22, which are provided by the fifth and tenth end closure panels 34a, 34b, are displaced inwardly away from the first and sixth end closure panels 26a, 26b. Optionally, the end portions of the handle strap 22, which are provided by the fifth and tenth end closure panels 34a, 34b, are brought to bear against the endmost articles C in the uppermost row, such that the uppermost row of articles C acts as a brace between the opposing ends of the handle strap 22.

Providing the third and fourth apertures A3, A4 at each end of the grip member 36 facilitates the deployment of the carrying handle H. The third and fourth apertures A3, A4 have the effect of reducing stress upon the first top panel 12 when the carrying handle H is in use. An opening is defined in the first top panel 12, in part by the grip member 36 and in part by the third and fourth apertures A3, A4. The removal of portions of the first top panel 12 by providing the third and fourth apertures A3, A4 moves the end edges of the opening towards the end edges of the first top panel 12. Therefore less of the first top panel 12 is disposed above the handle strap 22; the handle strap 22 can be displaced upwardly—further than would be the case if the third and fourth apertures A3, A4 were omitted—before encountering the first top panel 12. This has the effect of reducing the magnitude of the load force which is transferred to the first top panel 12. This in turn reduces the likelihood of tears developing in the first top panel 12.

Since less of the first top panel 12 is disposed over the handle strap 22, when the handle strap 22 is deployed the first top panel 12 exerts less resistance upon the handle strap 22, thus making deployment of the handle strap 22 easier.

The third and fourth apertures A3, A4 have the effect of shortening the grip member 36, whilst maintaining the end edges of the opening in closer proximity to the end edges of the first top panel 12 than they would be if the third and fourth apertures A3, A4 were omitted. This allows the first, second, third and fourth severance lines 39a, 39b, 39c, 39d to be shorter. In this way, the grip member 36 is more easily separated from the first top panel 12.

The third and fourth apertures A3, A4 may also provide a visual aid to the consumer, providing an intuitive carrying handle H that the consumer readily recognises and understands how to deploy.

The third and fourth apertures A3, A4 comprise side edges. Optionally the side edges are at least in part in vertical registry with a portion of the side edges of the handle strap 22 when in a set up condition. The side edges of the third and fourth apertures A3, A4 act as tear guides, facilitating severance of the severance line 21. This aids the consumer when initially deploying the carrying handle H by focussing shearing force upon the severance line 21.

The ends of the handle reinforcing panel 24 each comprise a rounded end edge. It has been found that providing the handle reinforcing panel 24 with rounded end edges considerably improves the strength of the carrying handle H when compared to a handle reinforcing panel having straight end edges. Handle reinforcing panels having straight end edges tend to break or cut the handle strap 22 proximate one of the straight end edges. It is thought this may be because the straight end edges serve as a cutting guide for the ply formed by the handle strap 22, especially when the handle reinforcing panel 24 is arranged in contacting relationship underneath, or directly below, the handle strap 22.

As shown in FIG. 3, the handle strap 22 may have a width B1 at least slightly narrower than the width B2 of the end edge of grip member 36, so that there will be less friction or cutting created in top panel 12 as the handle is deployed or used. Also making the handle strap 22 narrower than the grip member 36 (or narrower than the width B3 of apertures A3, A4) may make it more evident that handle strap 22 is present as a reinforcing layer.

Figure 4:
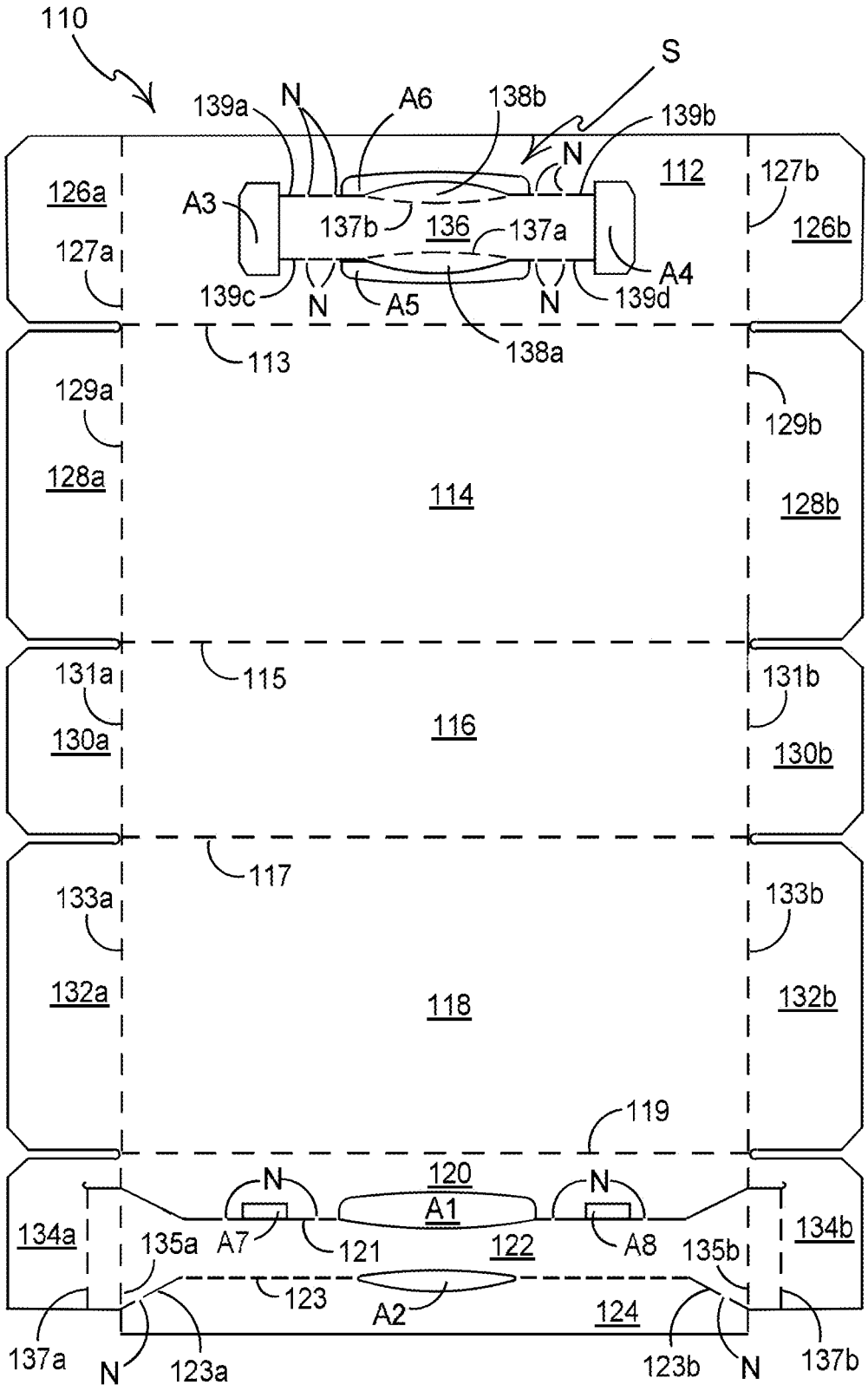
FIG. 4 is a plan view from above of a blank for forming a carton according to a second embodiment.
Figure 5:
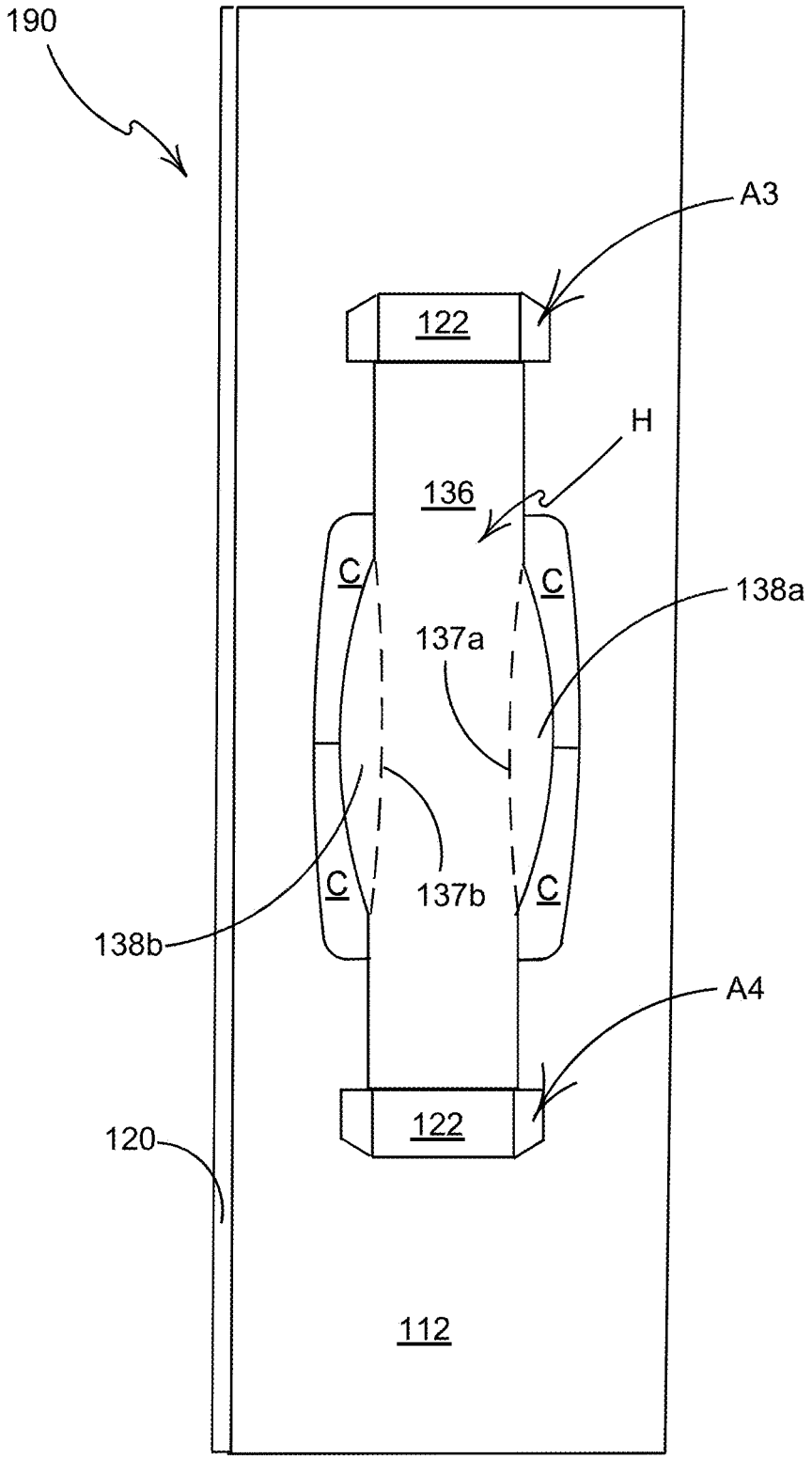
FIG. 5 is a top view of a carton formed from the blank of FIG. 4.

Referring now to FIGS. 4 and 5, there is shown an additional embodiment of the present disclosure. In the second illustrated embodiment, like numerals have, where possible, been used to denote like parts, albeit with the addition of the prefix "100" to indicate that these features belong to the second embodiment. The additional embodiment shares many common features with the first embodiment and therefore only the differences from the embodiment illustrated in FIGS. 1 to 3 will be described in detail.

FIG. 4 illustrates a blank 110 for forming a carton 190 as shown in FIG. 5, according to a second illustrated embodiment.

The blank 110 comprises a plurality of main panels 112, 114, 116, 118, 120 hinged one to the next in a linear series. The blank 110 comprises a first top panel 112 hinged to a first side panel 114 by a fold line 113. The first side panel 114 is hinged to a base panel 116 by a fold line 115. The base panel 116 is hinged to a second side panel 118 by a fold line 117. The second side panel 118 is hinged to a second top panel 120 by a fold line 119.

The plurality of main panels 112, 114, 116, 118, 120 of the blank 110 form an open ended tubular structure in a set up condition.

Each of the ends of the tubular structure is at least partially closed by end closure panels. In the illustrated embodiment the ends of the tubular structure are fully closed by end closure panels 126a, 128a, 130a, 132a, 134a, 126b, 128b, 130b, 132b, 134b.

End closure panels 126a, 128a, 130a, 132a, 134a are configured to close a first end of the tubular structure and end panels 126b, 128b, 130b, 132b, 134b are configured to close a second end of the tubular structure.

The blank 110 comprises a handle structure S in the first top panel 112. The handle structure S comprises a grip member 136 struck from the first top panel 112. Optionally, the grip member 136 comprises a first cushioning flap 138a hinged to a first side edge thereof by a fold line 137a. The grip member 136 comprises a second optional cushioning flap 138b hinged to a second side edge, opposing the first side edge, by a fold line 137b. A third aperture A3 defines a first end of the grip member 136. A fourth aperture A4 defines a second end of the grip member 136.

In the embodiment illustrated in FIGS. 4 and 5 the third and fourth apertures A3, A4 are wider than the respective adjacent portions of the grip member 136. The second top panel 120 comprises a seventh aperture A7 and an eighth aperture A8. The seventh aperture A7 is arranged to be in vertical registry with a portion of the third aperture A3. The eighth aperture A8 is arranged to be in vertical registry with a portion of the fourth aperture A4. The third, fourth, seventh and eighth apertures A3, A4, A7, A8 expose to view portions of the handle strap 122 at each end of the grip member 136; opposing side edges of the handle strap 122 are clearly visible, see FIG. 5. Portions of the articles C may also be visible through the opening in the composite top panel 112/120 defined by the third, fourth, seventh and eighth apertures A3, A4, A7, A8. By arranging the openings in the composite top panel 112/120 to be wider than the handle strap 122 the likelihood of the handle strap 122 becoming snagged or caught up on the composite top panel 112/120 when the carrying handle H is deployed is reduced. A clear visual indication is given to the consumer that the handle strap 122 extends below the outermost ply 112 of the composite top panel 112/120.

A fifth aperture A5 defines a side edge of the first cushioning flap 138a and adjacent side edge portions of the grip member 136. A sixth aperture A6 defines a side edge of the second cushioning flap 138b and adjacent side edge portions of the grip member 136. The grip member 136 is severably coupled to the first top panel 112 by a first severance line 139a, second severance line 139b, third severance line 139c, and fourth severance line 139d. Nick portions N connect the grip member 136 to the first top panel 112. The nick portions N are severable so as to allow the grip member 136 (and cushioning flaps 138a, 138b) to be detached from the first top panel 112.

The blank 110 comprises a first cut line 123a at a first end of the fold line 123. First cut line 123a is linear. The blank 110 comprises a second cut line 123b at a second end of the fold line 123. Second cut line 123b is linear. The severance line 121 comprises corresponding linear portions which are divergently arranged with respect to an opposing one of the first or second cut lines 123a, 123b. In this way the ends of the handle strap 122 comprise tapered portions which widen as the handle strap 122 extends into the fifth and tenth and closure panels 134a, 134b. This may provide added strength to the handle strap 122 in these areas. A handle reinforcing panel 124 may be provided which extends substantially along the entire length of the handle strap 122 at least up to the point where the handle strap 122 widens as it approaches the end closure panels 134a, 134b.

In some embodiments the first and second cut lines 123a, 123b may be formed as severance lines which are severed when the carrying handle H is deployed.

Figure 6:
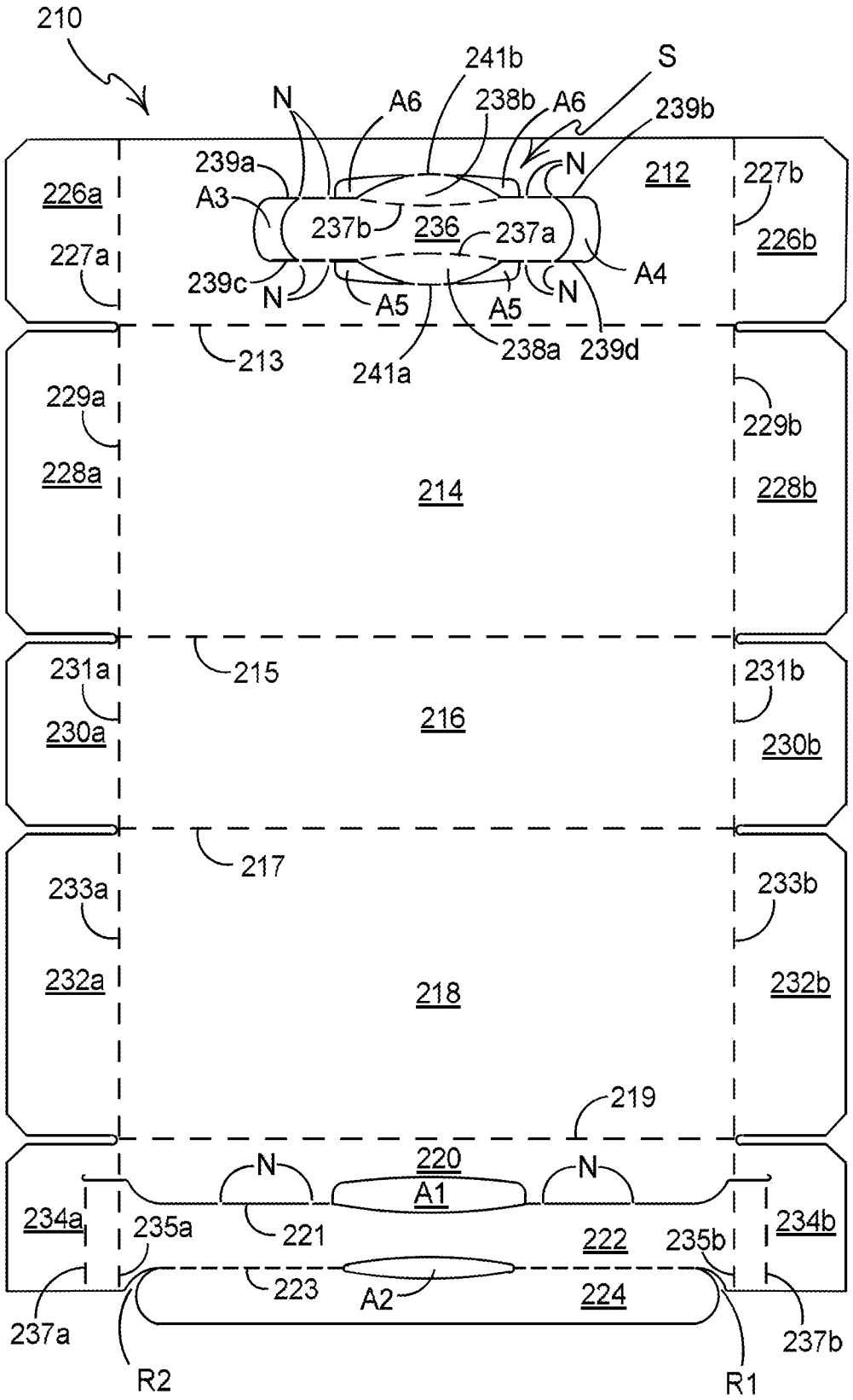
FIG. 6 is a plan view from above of a blank for forming a carton according to a third embodiment.
Figure 7:
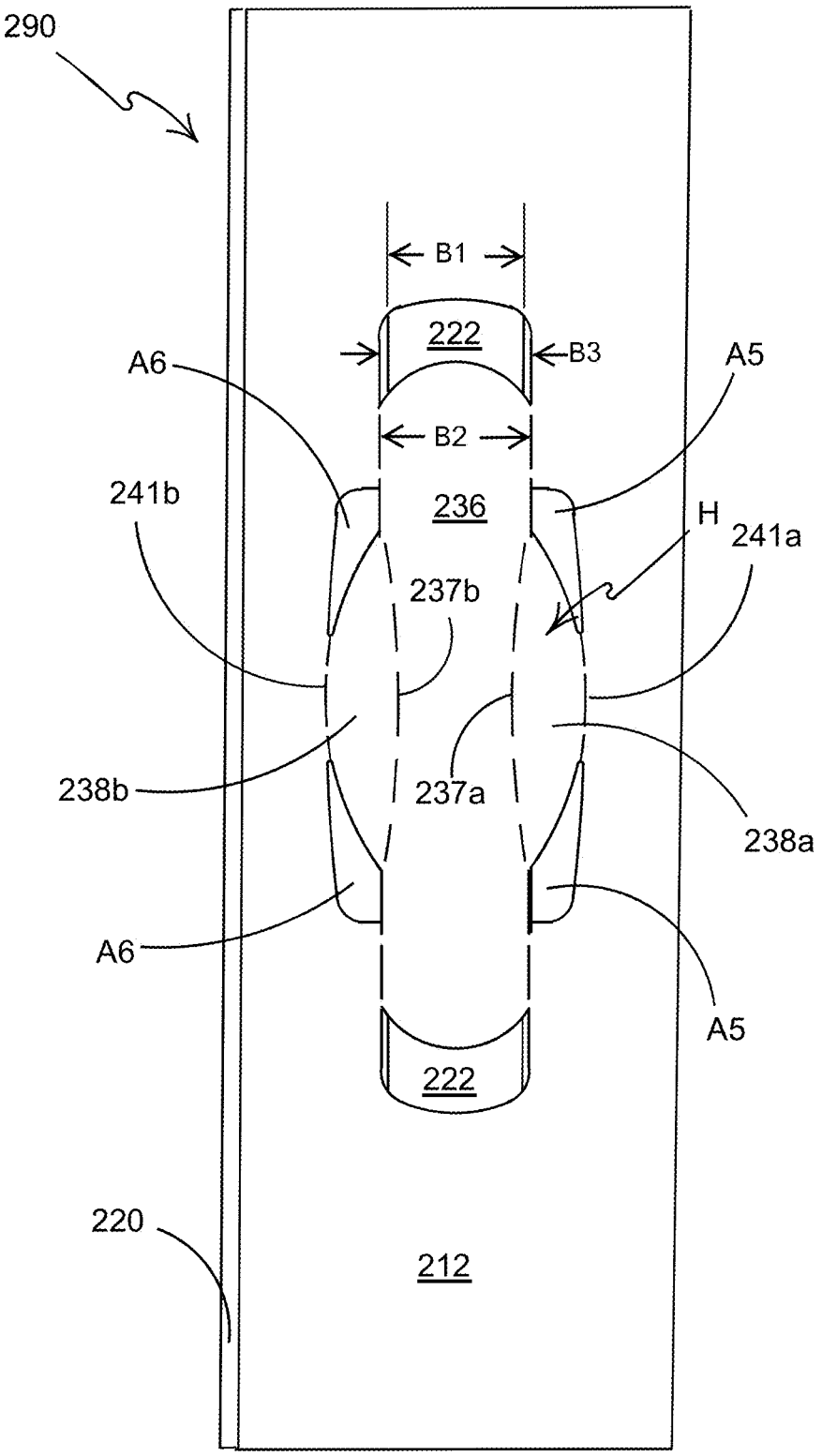
FIG. 7 is a top view of a carton formed from the blank of FIG. 6.

Referring now to FIGS. 6 and 7, there is shown an additional embodiment of the present disclosure. In the third illustrated embodiment, like numerals have, where possible, been used to denote like parts, albeit with the addition of the prefix "200" to indicate that these features belong to the third embodiment. The third embodiment shares many common features with the first and second embodiments and therefore only the differences from the first and second embodiments illustrated in FIGS. 1 to 5 will be described in detail.

FIG. 6 illustrates a blank 210 for forming a carton 290 (see FIG. 7) according to a third illustrated embodiment.

The blank 210 comprises a plurality of main panels 212, 214, 216, 218, 220 hinged one to the next in a linear series. The blank 210 comprises a first top panel 212 hinged to a first side panel 214 by a fold line 213. The first side panel 214 is hinged to a base panel 216 by a fold line 215. The base panel 216 is hinged to a second side panel 218 by a fold line 217. The second side panel 18 is hinged to a second top panel 220 by a fold line 219.

The plurality of main panels 212, 214, 216, 218, 220 of the blank 210 form an open ended tubular structure in a set up condition.

Each of the ends of the tubular structure is at least partially closed by end closure panels. In the illustrated embodiment the ends of the tubular structure are fully closed by end closure panels 226a, 228a, 230a, 232a, 234a, 226b, 228b, 230b, 232b, 234b.

End closure panels 226a, 228a, 230a, 232a, 234a are configured to close a first end of the tubular structure and end panels 226b, 228b, 230b, 232b, 234b are configured to close a second end of the tubular structure.

A handle strap 222 is struck from the second top panel 220. The handle strap 222 is defined in part by a severance line 221. The handle strap 222 is defined in part by an aperture A1. The severance line 221 extends longitudinally across the second top panel 220 and into each of the fifth and tenth end closure panels 234a, 234b. The handle strap 222 may be made wider as it approaches the fifth and tenth end closure panels 234a, 234b to provide added strength. The severance line 221 terminates in each of the fifth and tenth end closure panels 234a, 234b with a "J" or "C" shaped cut line portion. The handle strap 222 is severably coupled to the second top panel 220 and can be detached therefrom.

A handle reinforcing panel 224 is hinged to the handle strap 222 by a fold line 223. The handle reinforcing panel 224 may extend substantially along the entire length of the handle strap 222 at least up to the point where the handle strap 222 widens as it approaches the end closure panels 234a, 234b.

The blank 210 comprises a first recess or cutaway R1 at a first end of the fold line 223. The first cutaway R1 may be arcuate in shape.

The blank 210 comprises a second recess or cutaway R2 at a second end of the fold line 223. The second cutaway R2 may be arcuate in shape.

The severance line 221 comprises corresponding arcuate portions which are divergently arranged with respect to an opposing one of the first or second cutaways R1, R2.

The blank 210 comprises a handle structure S in the first top panel 212. The handle structure S comprises a grip member 236 struck from the first top panel 212. Optionally, the grip member 236 comprises a first cushioning flap 238a hinged to a first side edge thereof by a fold line 237a. The grip member 236 comprises a second optional cushioning flap 238b hinged to a second side edge, opposing the first side edge, by a fold line 237b. A third aperture A3 defines a first end of the grip member 236. A fourth aperture A4 defines a second end of the grip member 236.

The grip member 236 is severably coupled to the first top panel 212 by a first severance line 239a, second severance line 239b, third severance line 239c, and fourth severance line 239d. Nick portions N connect the grip member 236 to the first top panel 212.

A fifth aperture A5 defines a side edge of the first cushioning flap 238a and adjacent side edge portions of the grip member 236. A sixth aperture A6 defines a side edge of the second cushioning flap 238b and adjacent side edge portions of the grip member 236.

The first cushioning flap 238a extends across the fifth aperture A5 so as to interrupt the fifth aperture A5, in effect dividing the fifth aperture A5 into two apertures. The first cushioning flap 238a is severably coupled to the first top panel 212 by a fifth severance line 241a. Nick portions N connect the first cushioning flap 238a to the first top panel 212.

The second cushioning flap 238b extends across the sixth aperture A6 so as to interrupt the sixth aperture A6, in effect dividing the sixth aperture A6 into two apertures. The second cushioning flap 238b is severably coupled to the first top panel 212 by a sixth severance line 241b. Nick portions N connect the second cushioning flap 238b to the first top panel 212.

The nick portions N are severable so as to allow the grip member 236 (and cushioning flaps 238a, 238b) to be detached from the first top panel 212.

The ends of the handle reinforcing panel 224 each comprise a rounded end edge. It has been found that providing the handle reinforcing panel 224 with rounded end edges considerably improves the strength of the carrying handle H when compared to a handle reinforcing panel having straight end edges. Handle reinforcing panels having straight end edges tend to break or cut the handle strap 222 proximate one of the straight end edges. It is thought this may be because the straight end edges serve as a cutting guide for the ply formed by the handle strap 222, especially when the handle reinforcing panel 224 is arranged in contacting relationship underneath, or directly below, the handle strap 222.

The recesses R1, R2 each form a slot separating the respective ends of the handle reinforcing panel 224 from the adjoining portion of the handle strap 222. It has been found that cut lines at each end of the handle reinforcing panel 224 may create a snagging or catching point, which may cause two blanks 210 to stick together on a packaging machine, for example when a stack of blanks are being withdrawn from a hopper by a blank feeder. One solution to this is to provide the cut lines 123a, 123b with one or more connection nicks which interrupt the cut lines 123a, 123b, as shown in FIG. 4. FIG. 6 illustrates an alternative solution; providing the recesses R1, R2 overcomes the snagging problem and avoids the need to provide connection nicks which may be difficult to break, which would hinder folding of the handle reinforcing panel 224.

The severance lines 241a, 241b eliminate, or at least reduce the likelihood of the cushioning flaps 238a, 238b creating a catching or snagging point that may cause undesired binding together of two blanks 210 in a stack.

As shown in FIG. 7, the handle strap 222 may have a width B1 at least slightly narrower than the width B2 of the end edge of grip member 236, so that there will be less friction or cutting created in top panel 212 as the handle is deployed or used. Also making the handle strap 222 narrower than the grip member 236 (or narrower than the width B3 of apertures A3, A4) may make it more evident that handle strap 222 is present as a reinforcing layer.

Referring now to FIGS. 8 through 57, there are shown additional embodiments of a carton and its handle structure. The embodiments of FIGS. 8 to 57 share many common features with the earlier embodiments and therefore only certain differences will be described in detail. The assembly of the additional carton embodiments may be similar to those described with the earlier embodiments, including folding, gluing, etc. In particular, the embodiments of FIGS. 8 to 57 show various ways to make a user more aware of the presence of a handle strap below the grip member. In these illustrated embodiments, like numerals have, where possible, been used to denote like parts, albeit with the addition of the prefix "300". It will be understood from the earlier discussion that the term 'handle' may sometimes be used as a generic term to describe the entire structure by which a user may pick up the carton in his hand. Thus 'handle' may refer to the combination of grip member, handle strap, and handle reinforcing panel. The terms "grip member being deployed" or "handle being deployed" may be used interchangeably in the discussion. Furthermore, 'grip member' may refer to a piece of the carton that is eventually held in the hand of a user, along with portions of the same piece of material that may extend longitudinally toward the end edges of the carton past the area actually gripped by the user.

The various embodiments of FIGS. 8-49 each help to make a user more aware of the presence of a handle strap 322 below the grip member 336. Typically the handle strap 322 (for example as shown by dimension B1 (FIGS. 8, 12, 35, 39) may be at least slightly narrower than the width B2 (examples in FIGS. 8, 12) of the end edge of grip member 336, so that there will be less friction or cutting created in top panel 312 as the handle is deployed or used. Also making the handle strap 322 narrower than the grip member 336 (or narrower than the width B3 (examples in FIGS. 8, 12, 35, 49) of openings around the grip member) may make it more evident to a user that handle strap 322 is present as a reinforcing layer.

To better understand the Figures, open areas of the carton blanks are shown with a cross hatched pattern, while the handle straps 322 are shown with a shaded pattern.

FIG. 8 shows a view of the top panels of a fourth carton 390A after its blank has been folded so that the handle strap 322A is just below the top panel 312. FIG. 9 shows the blank 310A from which carton 390A may be made.

The blank 310A comprises a plurality of main panels 312, 314, 316, 318, 320 hinged one to the next in a linear series. Top panel 312 is hinged to a first side panel 314 by a fold line 313. First side panel 314 is hinged to base panel 316 by fold line 315. Base panel 316 is hinged to second side panel 318 by fold line 317. Second side panel 318 is hinged to second or inside top panel 320 by fold line 319.

Blank 310A also includes first end closure panel 326a hinged to top panel 312 by fold line 327a, second end closure panel 328a hinged to first side panel 314 by fold line 329a, third end closure panel 330a hinged to base panel 316 by fold line 331a, fourth end closure panel 332a hinged to second side panel 318 by fold line 333a, and fifth end closure panel 334a hinged to second or inside top panel 320 by fold line 335a. Within fifth end closure panel 334a there may be a fold line 337a where the handle strap 322A meets the fifth end closure panel 334a.

Blank 310A also includes sixth end closure panel 326b hinged to top panel 312 by fold line 327b, seventh end closure panel 328b hinged to first side panel 314 by fold line 329b, eighth end closure panel 330b hinged to base panel 316 by fold line 331b, ninth end closure panel 332b hinged to second side panel 318 by fold line 333b, and tenth end closure panel 334b hinged to second or inside top panel 320 by fold line 335b. Within tenth end closure panel 334b there may be a fold line 337b where the handle strap 322A meets the tenth end closure panel 334b.

Besides the panels and flaps already described, the blank 310A may include cutaway portions 325A (FIG. 9) at the upper end edges. After the blank 310A has been folded, these cutaway portions 325A expose the handle strap 322A (FIG. 8) which is just below the handle. This gives a user an indication that the handle has additional structure and is sturdy enough to carry the carton.

Figure 11:
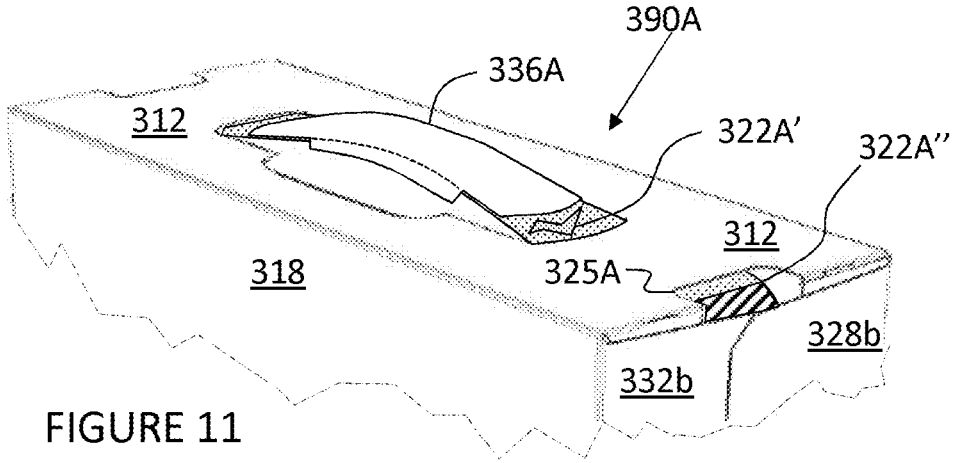
FIG. 11 is a perspective views from above of the carton of FIG. 10, with the handle in a deployed configuration.

Similar to the previous embodiments, the apertures or cutaway portions 325A may be struck from the top panel 312 between an end edge of grip member 336A and an associated end edge of the top panel 312 (e.g. the edge along fold lines 327a or 327b). While the previous embodiments had the cutaway portions contiguous to the end of the grip member, it will be noted that in FIGS. 8-9 (and also later in FIGS. 19-20) the cutaway portions may be struck from the top panel apart from the grip member. Whether the cutaway portion is apart from the grip member or defines an end edge of the grip member, at least a portion of the handle strap may be visible through the cutaway portion. Handle strap 322A may include indicia 322A', 322K which may be initially hidden within the carton and which may become visible as the handle is deployed and part of the handle strap 322A emerges from the carton, as seen in FIG. 11.

It may also be noted that, as seen in FIGS. 8-11, the cutaway portion in the top panel, through which at least a portion of the handle strap may be visible, may extend to the top panel end edge (e.g. fold line 327a, 327b) or even around the top panel end edge. This is true whether the cutaway portion is apart from the grip member (as in FIGS. 8-9) or if the cutaway portion defines an end edge of the grip member (as in FIGS. 10-11).

Figure 10:
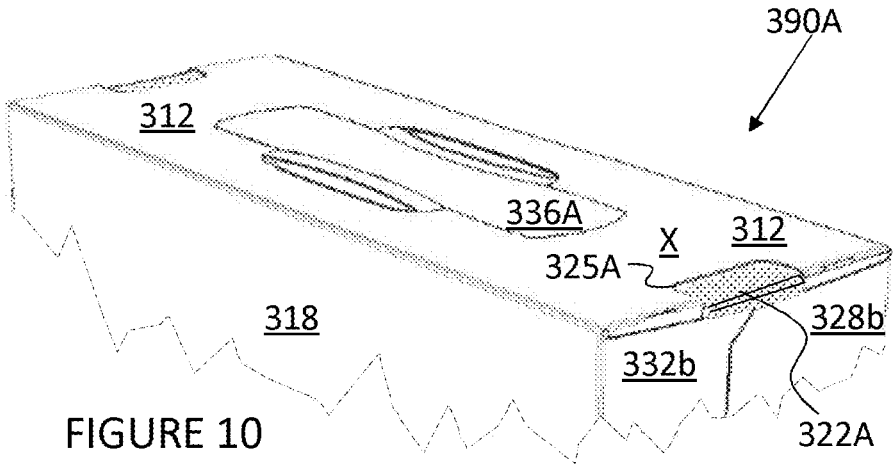
FIG. 10 is a perspective view from above of the carton of FIG. 8, with the handle in an as-manufactured configuration.

FIG. 10 shows a perspective view of the carton 390A and particularly its grip member 336A before deployment. The cutaway portion 325A of the top panel 312 at each end of the carton allows a portion 322A of the handle strap to be visible and show that additional handle structure is present. Grip member 336A is centrally located in the top panel 312, with a substantial portion "X" of material positioned between the end of the handle and the end corner of the carton. When the grip member 336A is deployed as shown in FIG. 11, the portions of handle strap 322A' adjacent the handle appear as the handle is pulled upward, while the portions of handle strap 322A" at the end corners may retreat slightly inward into the carton where they may wrap the end cans within the carton. The portions 322A" may also become visible through opening 325A. Portions of grip member 336A and/or handle strap 322A', 322A" may have indicia (color, symbols, etc.) that appear when the handle is lifted. In FIG. 11 and other Figures to follow showing the appearance of a carton with deployed handle, the indicia are generally shown on both ends of the handle, but it is understood that the indicia may be present on either or both ends of the structure.

Handle strap 322 may differ from grip member 336 or top panel 312 in visual characteristics. Different portions of handle strap 322 may differ from one another in visual characteristics. The visual characteristics may be at least one of color, pattern, texture, graphics, or indicia. This may make it more apparent to a user that the handle strap 322 is present, which may give the user more confidence in the strength of the handle structure. For example the area of handle strap 322A' which becomes visible upon deployment of the handle (for example in FIG. 11) may provide a message such as "good to go" or "all set" or "15 12 oz cans." The area may be a different color or a contrasting color, for example a green area against a red background of the overall top panel. When the handle is deployed, the area may provide one or more words or numbers to complete a message partially printed on the top panel. For example an end of the grip member may read "15" and the adjacent portion of the top panel may read "cans", with the nearby (initially hidden) area of the handle strap reading "12-oz". Thus when the handle is deployed the structure will read "15 12-oz cans." The width of handle strap 322A' may be slightly less than the width of the end of grip member 336A to allow the handle strap 322A' to move easily through the opening created when grip member 336A is raised, without chafing or cutting either the opening or the handle strap.

The difference in visual characteristic or characteristics whether between the top panel, grip member, or handle strap, may be evident in the carton before, during, or after the handle has been deployed and may serve to indicate that the handle has multiple layers.

Figure 12:
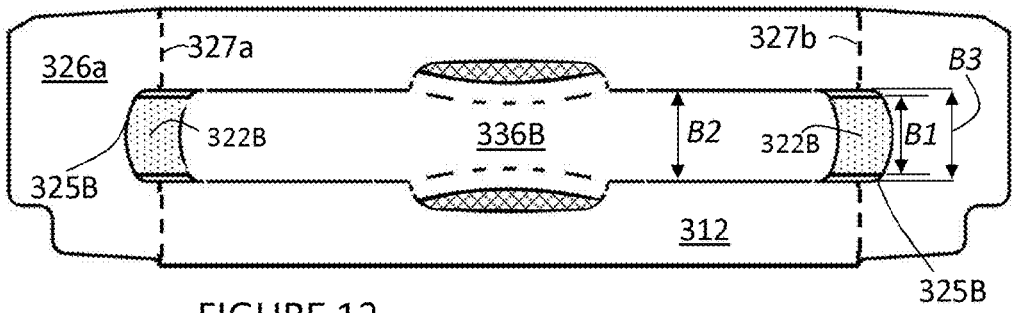
FIG. 12 is a view of the top panels of a fifth embodiment of a carton.
Figure 13:
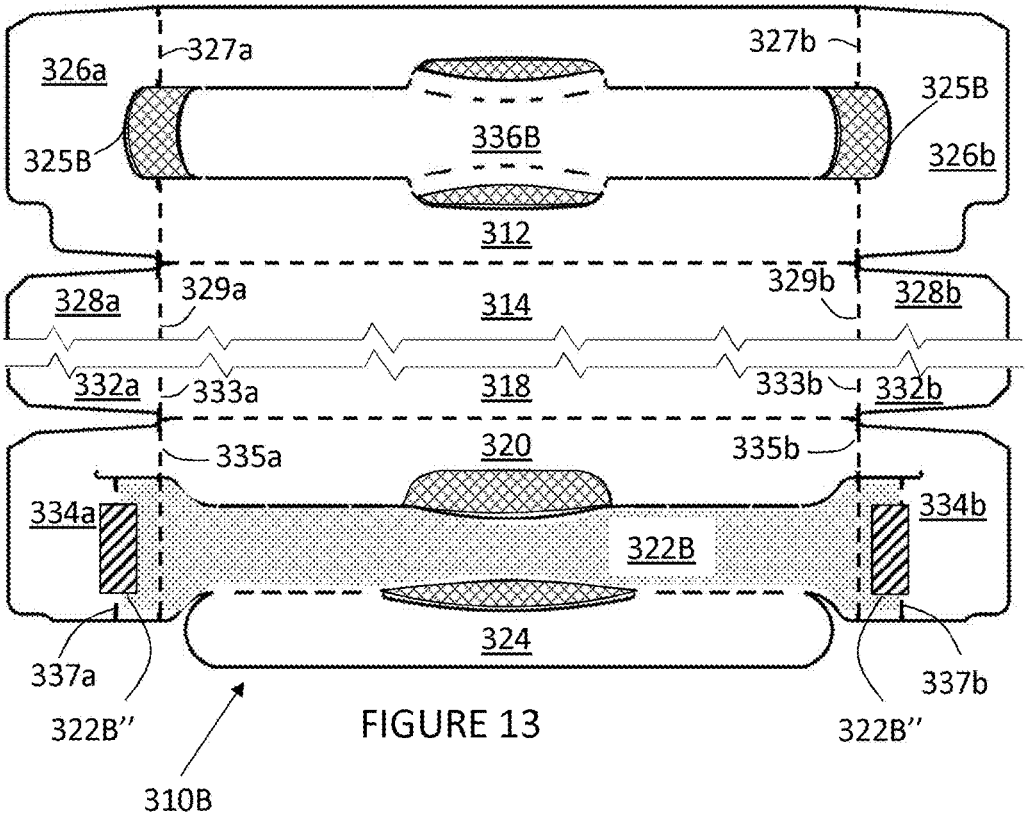
FIG. 13 is a plan view from above of a blank for forming the carton of FIG. 12.

FIG. 12 shows the top panels of a fifth carton 390B, and FIG. 13 shows the blank 310B from which the carton may be made. Again openings 325B are provided (FIG. 13) in the top/side of the carton so that the user may see handle strap 322B through the openings (FIG. 12). To conserve space in FIG. 13, the base panel 316 and lower portions of first side panel 314 and second side panel 318 are omitted as denoted by the division lines. This is also true in FIGS. 17, 28, 32, 36, 40, and 44.

As shown in FIG. 12, at least a portion of handle strap 322B may be sufficiently narrower than opening 325B under which it lies, so that it may be evident to the user that the handle strap is present.

Figure 14:
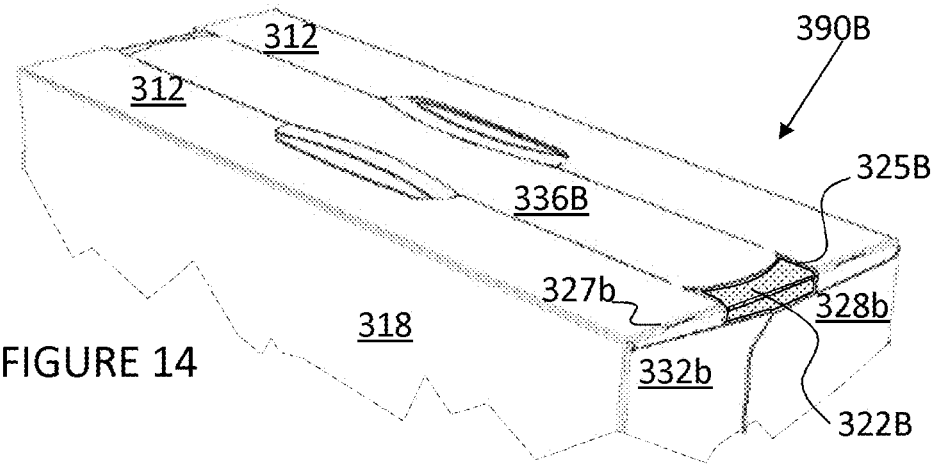
FIGS. 14-15 are perspective views from above of the carton of FIG. 12, with the handle in an as-manufactured configuration and a deployed configuration respectively.
Figure 15:
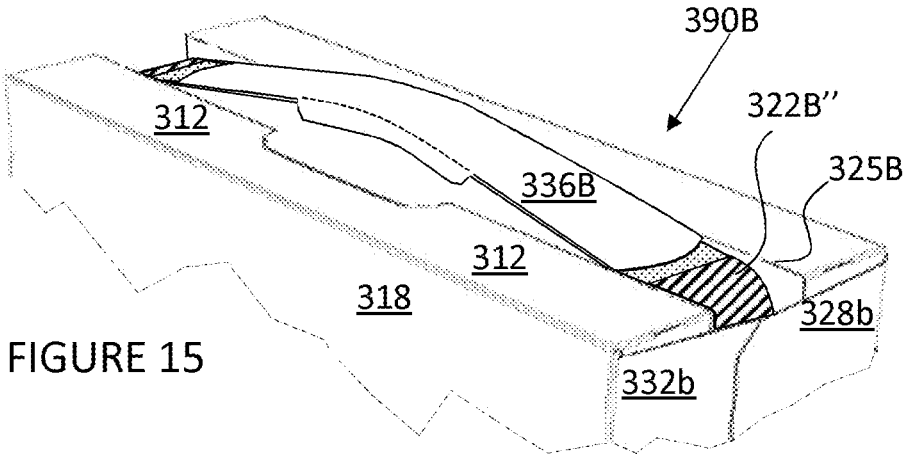

FIG. 14 shows the handle before deployment. A portion of the top panel 312 and/or end panels is cut away at each end of the carton so that a portion 322B of the handle strap is visible. Grip member 336B extends nearly to the ends of the carton. When the handle is deployed as shown in FIG. 15, the portions 322W of handle strap 322 adjacent the handle and originally situated at the end corners become more visible as they are pulled upward and inward and may wrap the end cans within the carton. Portions of grip member 336B and/or handle strap 322B" may have indicia (color, symbols, etc.) that appear when the handle is lifted.

Figure 16:
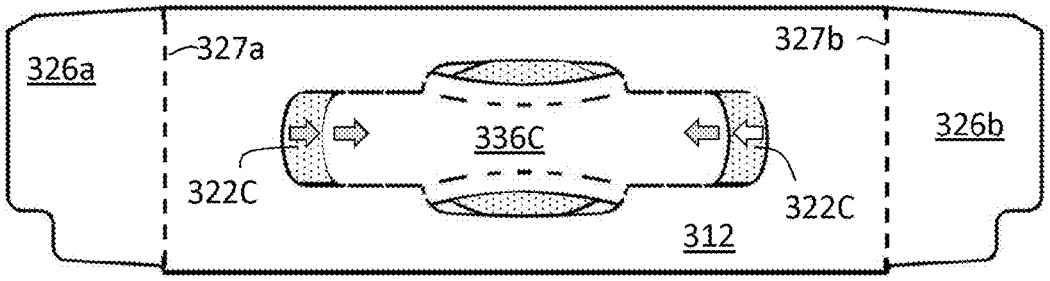
FIG. 16 is a view of the top panels of a sixth embodiment of a carton.
Figure 17:
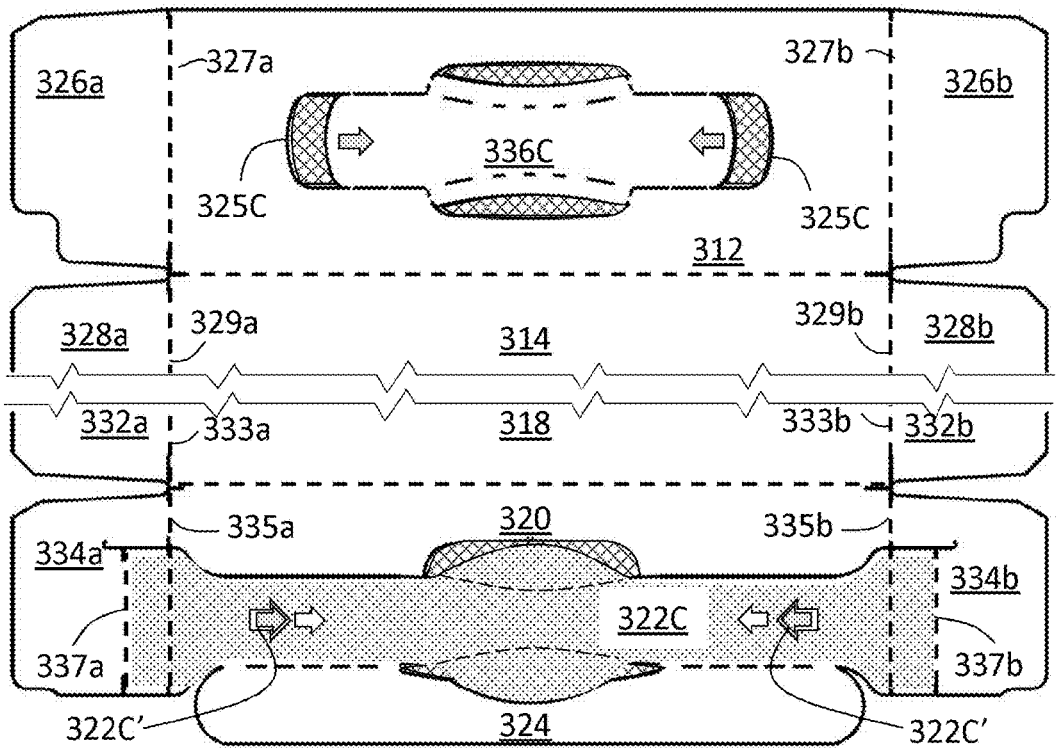
FIG. 17 is a plan view from above of a blank for forming the carton of FIG. 16.

FIG. 16 shows the top panels of a sixth carton 390C, and FIG. 17 shows the blank 310C from which carton 390C may be made. Openings 325C are provided in the top panel 312 of the carton (FIG. 17) so that the user may see handle strap 322C through the openings (FIG. 16).

Figure 18:
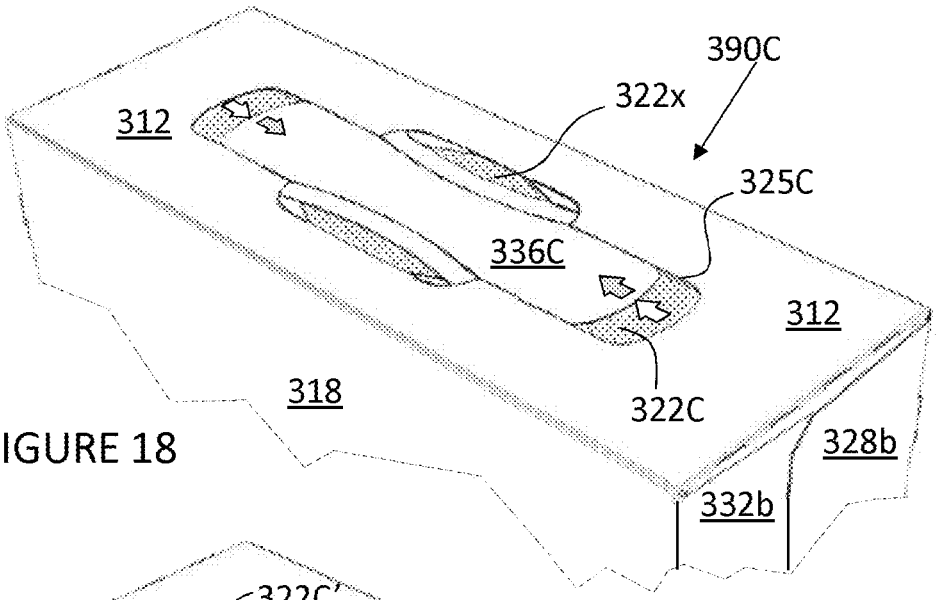
FIGS. 18-19 are perspective views from above of the carton of FIG. 16, with the handle in an as-manufactured configuration and a deployed configuration respectively.
Figure 19:
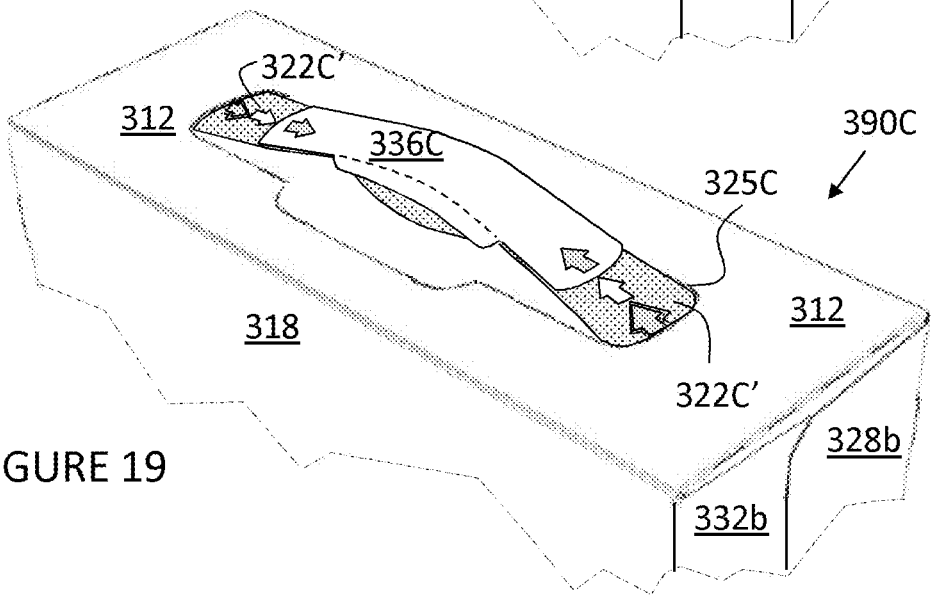

FIG. 18 shows carton 390C and particularly its grip member 336C before deployment. A portion of the top panel 312 is cut away at each end of grip member 336C so that a portion 322C of the handle strap is visible. Furthermore, portions 322x of the handle strap may be visible around the grip member and may provide additional cushioning to the user's hand. When grip member 336C is deployed as shown in FIG. 19, the portions of handle strap 322C' adjacent the grip member 336C become more visible as they are pulled upward with the grip member. Indicia such as logos, words, symbols, etc. may be provided on the grip member 336C and handle strap 322C, 322C' to provide directions, information, interesting facts, or other details.

FIGS. 20-25 show example details of indicia that may be provided on the grip member or the handle strap. Many other types of indicia may be used as well.

Figure 20:
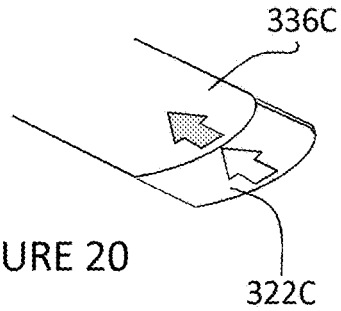
FIGS. 20-21 are perspective views of certain carton handle details, with the handle in an as-manufactured configuration and a deployed configuration respectively.
Figure 21:
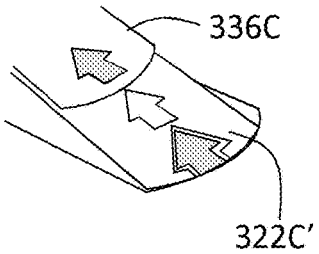

FIG. 20 shows a detail of the end of grip member 336C before deploying the handle. The end(s) of the grip member, and/or the portion of handle strap 322C may include indicia such as arrows to suggest the usage of the handle, for example that lifting the handle will pull it inwardly and that there is a reinforcing layer—the handle strap 322C—that will move along with the grip member 336C. FIG. 21 shows the handle having been deployed. More indicia such as additional arrows may appear as the handle strap 322C' extends from the carton and becomes more visible.

Figure 22:
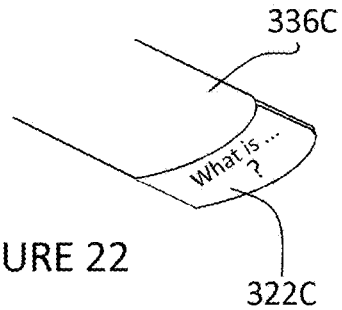
FIGS. 22-23 are additional perspective views of carton handle details, with the handle in an as-manufactured configuration and a deployed configuration respectively.
Figure 23:
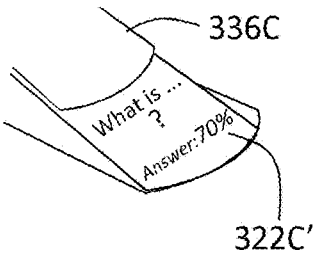

FIG. 22 shows a detail of the end of another grip member 336C before deploying the handle. The end(s) of the grip member, and/or the portion of handle strap 322C may include indicia such as a trivia question for example "What is . . . " FIG. 23 shows the handle having been deployed. More indicia such as the answer to the trivia question may appear as the handle strap 322C' extends from the carton and becomes more visible.

Figure 24:
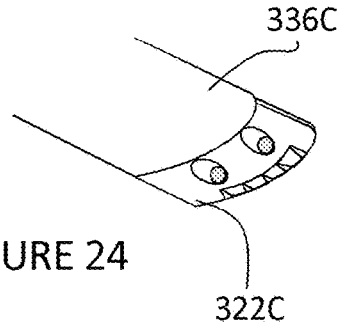
FIGS. 24-25 are yet more perspective views of carton handle details, with the handle in an as-manufactured configuration and a deployed configuration respectively.
Figure 25:
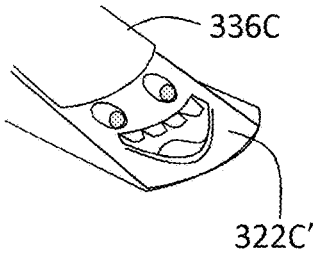

FIG. 24 shows a detail of the end of another grip member 336C before deploying the handle. The end(s) of the grip member, and/or the portion of handle strap 322C may include indicia such as a drawing or part of a drawing (as an example, the upper part of the face of a real person or cartoon character). FIG. 25 shows the handle having been deployed. More indicia such as the remainder of the drawing (as an example, the lower part of the face) may appear as the handle strap 322C' extends from the carton and becomes more visible.

Figure 26:
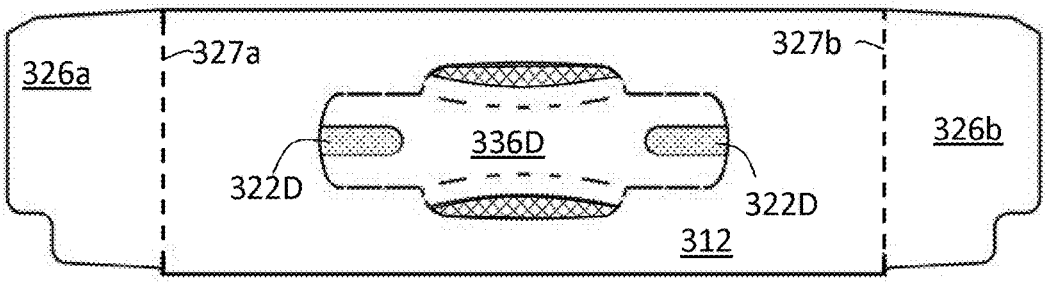
FIG. 26 is a view of the top panels of a seventh embodiment of a carton.
Figure 27:
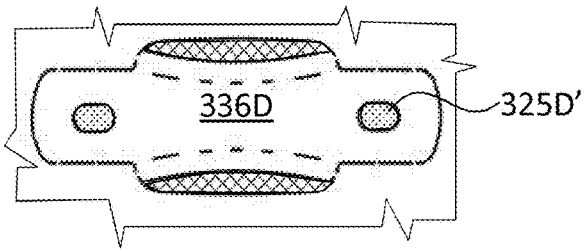
FIG. 27 is a view from above of an alternate design.
Figure 28:
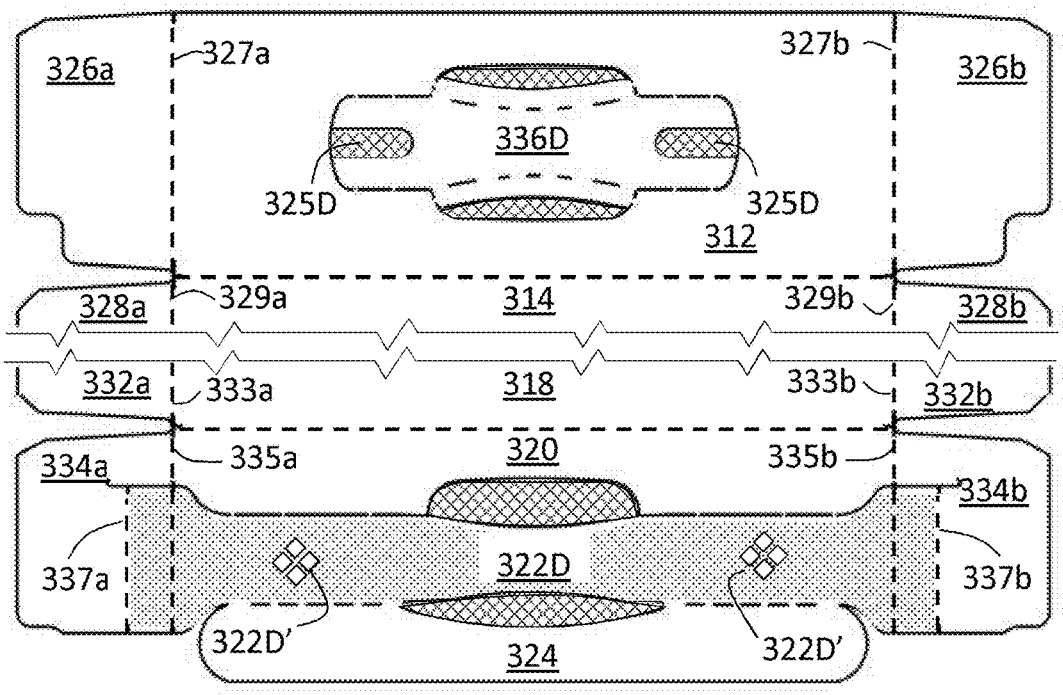
FIG. 28 is a plan view from above of a blank for forming the carton of FIG. 26.

FIG. 26 shows the top panels of a seventh carton 390D, and FIG. 28 shows the blank 310D from which carton 390D may be made. Openings 325D are provided (FIG. 28) within the grip member 336D and the openings are sufficiently large so that the user may see handle strap 322D through the openings (FIG. 26). The openings 325D may be longitudinal portions of the grip member 336D that are cut away at each end of grip member 336D so that a portion 322D of the handle strap is visible. In an alternative design as shown in FIG. 27, openings 325' may be formed entirely within the grip member instead of extending from its ends.

Figure 29:
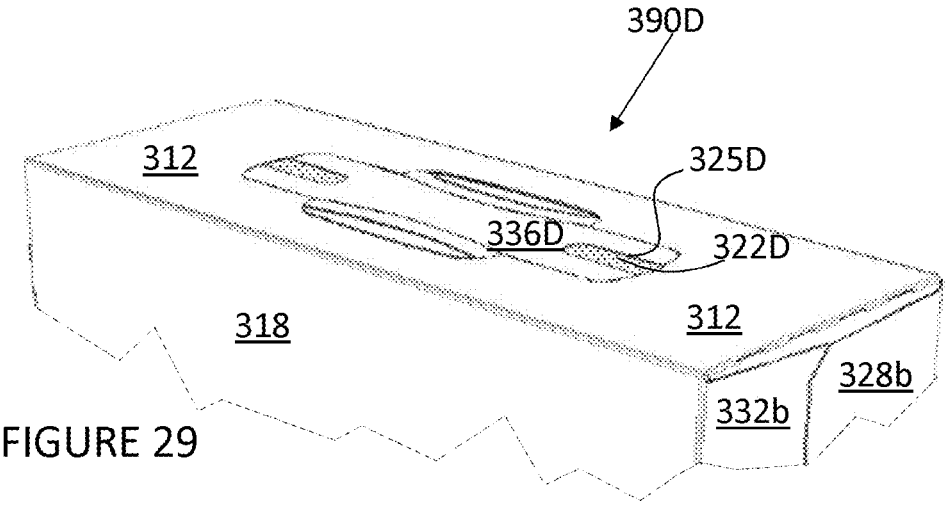
FIGS. 29-30 are perspective views from above of the carton of FIG. 26, with the handle in an as-manufactured configuration and a deployed configuration respectively.
Figure 30:
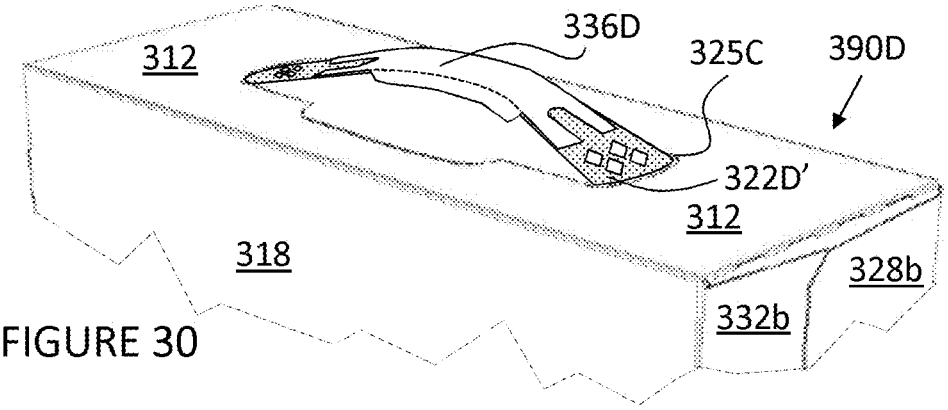

FIG. 29 shows the carton 390D and particularly its grip member 336D before deployment. Longitudinal portions of the grip member 336D are cut away at each end of grip member 336D so that a portion 322D of the handle strap is visible. When grip member 336D is deployed as shown in FIG. 30, the portions of handle strap 322D' adjacent the grip member become visible as they are pulled upward with the handle. Indicia may be provided on the grip member 336D and/or handle strap 322D, 322D'.

Figure 31:
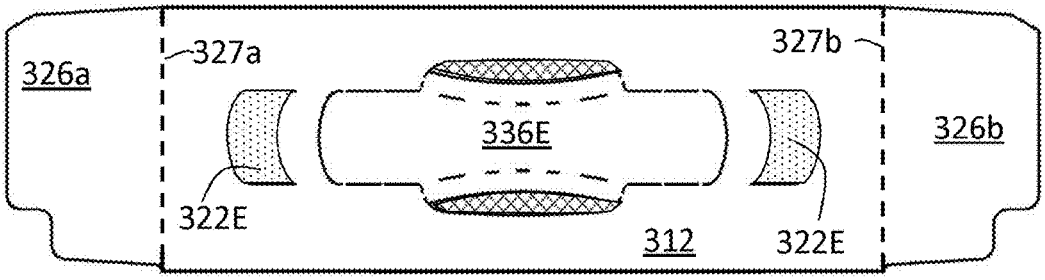
FIG. 31 is a view of the top panels of an eighth embodiment of a carton.
Figure 32:
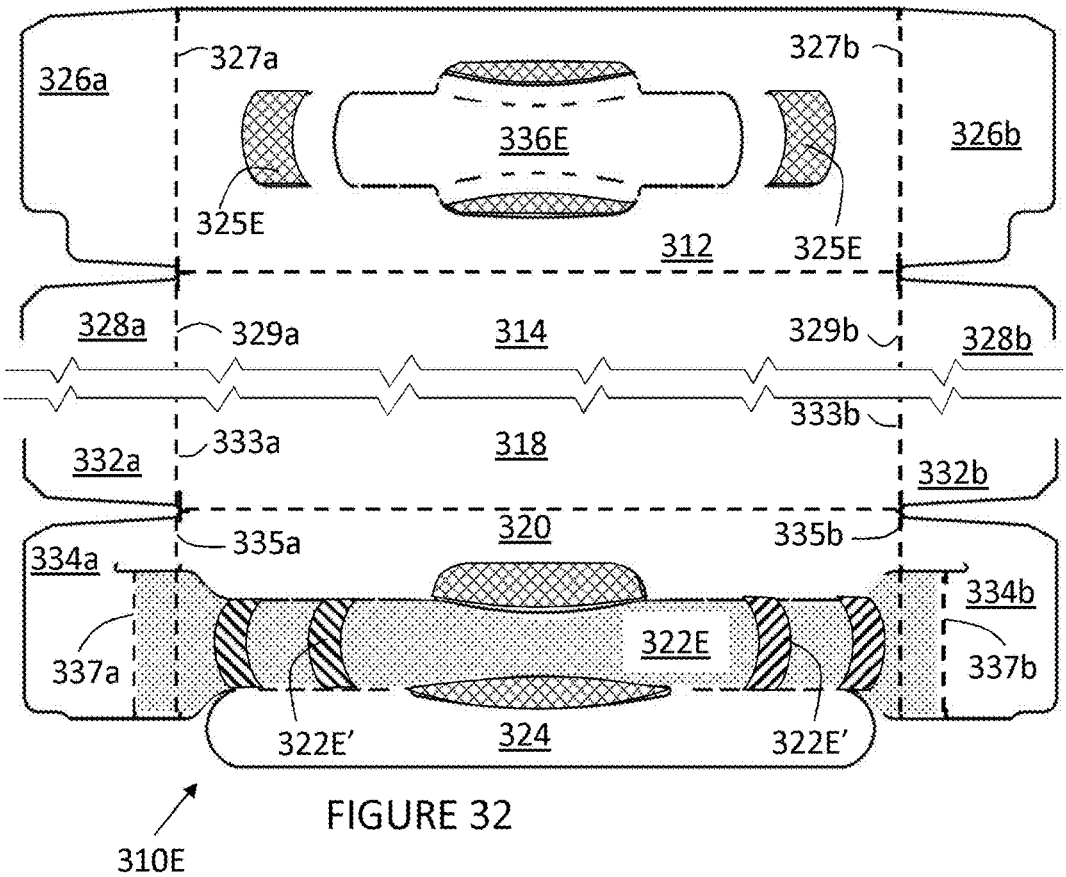
FIG. 32 is a plan view from above of a blank for forming the carton of FIG. 31.

FIG. 31 shows the top panels of an eighth carton 390E, and FIG. 32 shows the blank 310E from which carton 390E may be made. Openings 325E are provided (FIG. 32) within the grip member 336E so that the user may see handle strap 322E through the openings (FIG. 31).

Figure 33:
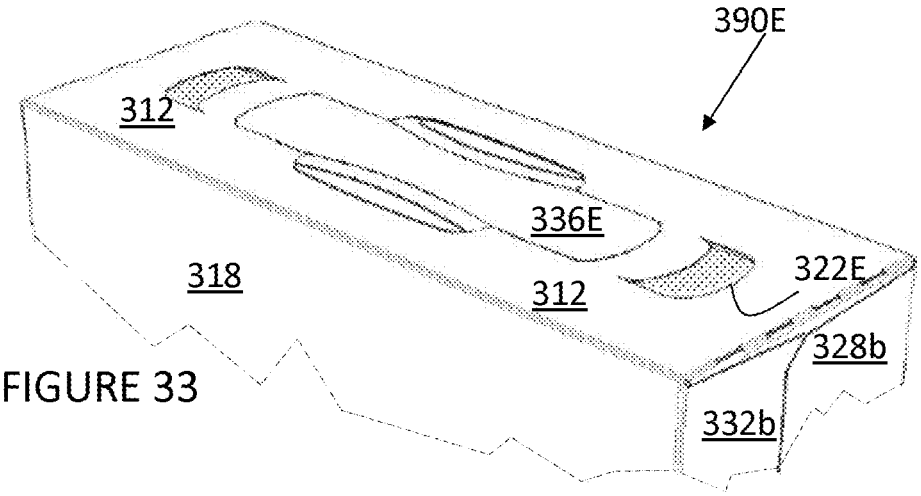
FIGS. 33-34 are perspective views from above of the carton of FIG. 31, with the handle in an as-manufactured configuration and a deployed configuration respectively.
Figure 34:
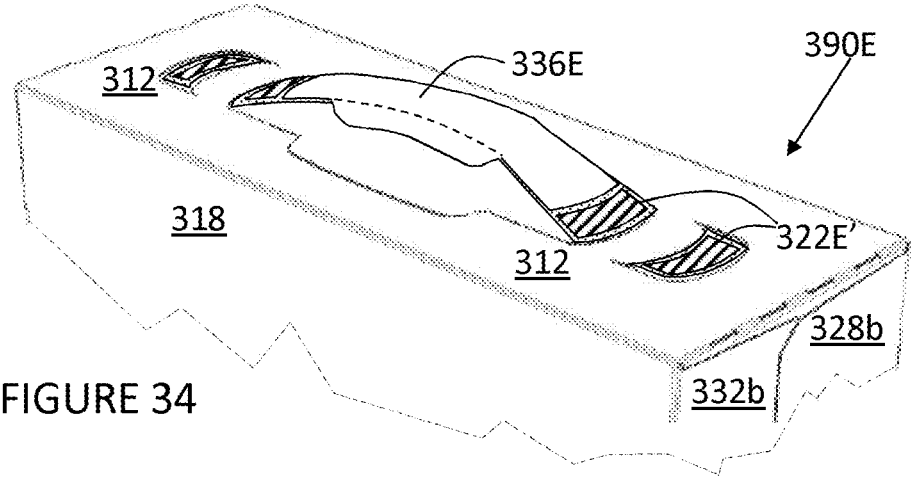

FIG. 33 shows carton 390E and particularly its grip member 336E before deployment. A portion of the top panel 312 between each end of grip member 336E and the respective end of the carton is cut away so that a portion 322E of the handle strap is visible. When grip member 336E is deployed as shown in FIG. 34, portions of handle strap 322E' adjacent the grip member may become more visible as they are pulled upward with the grip member. Meanwhile the portions of handle strap 322E' at the cut away may move as the grip member pulls the handle strap. Indicia may be provided on grip member 336E and/or handle strap 322E, 322E'. The indicia may be color, symbols, etc. that appear when the handle is lifted.

Figure 35:
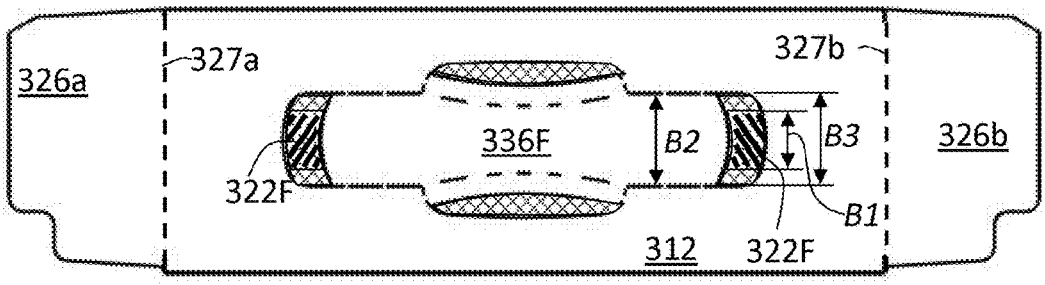
FIG. 35 is a view of the top panels of a ninth embodiment of a carton.
Figure 36:
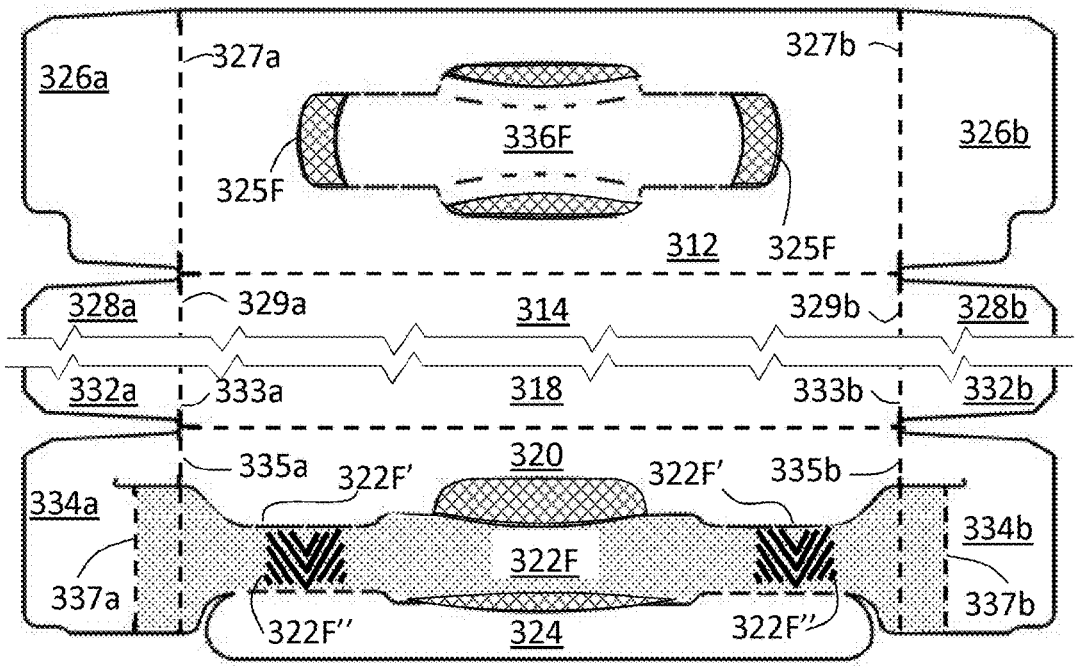
FIG. 36 is a plan view from above of a blank for forming the carton of FIG. 35.

FIG. 35 shows the top panels of a ninth carton 390F, and FIG. 36 shows the blank 310F from which carton 390F may be made. Openings 325F are provided (FIG. 36) at the ends of grip member 336F so that the user may see handle strap 322F through the openings (FIG. 35). As shown in FIG. 35, the openings 325F may be sized so that some open space is present around the handle strap 322F to make it evident that handle strap 322F is present.

Figure 37:
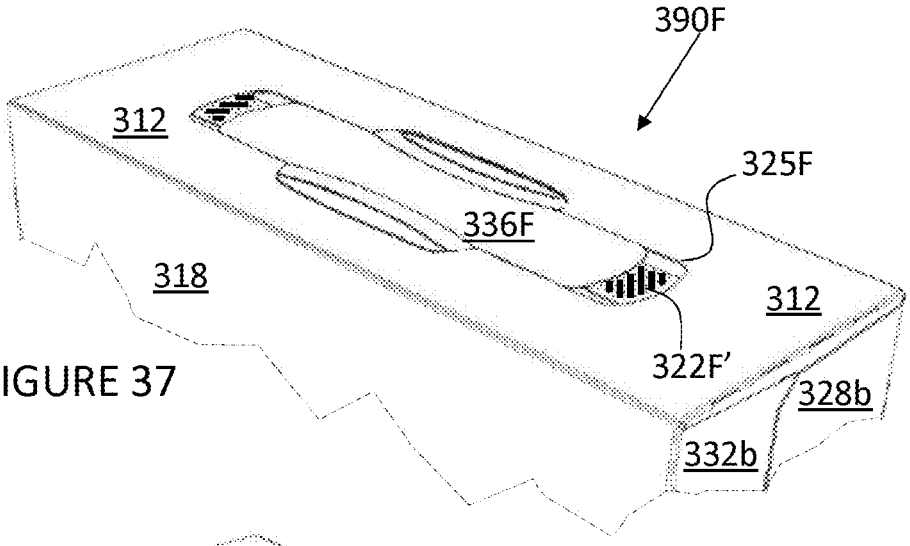
FIGS. 37-38 are perspective views from above of the carton of FIG. 35, with the handle in an as-manufactured configuration and a deployed configuration respectively.
Figure 38:
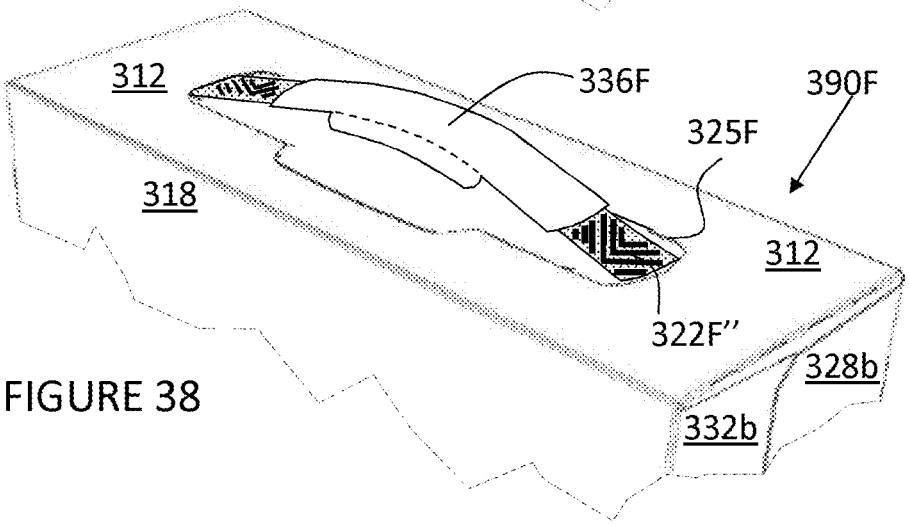

FIG. 37 shows carton 390F and particularly its grip member 336F before deployment. A portion of the top panel 312 is cut away at each end of grip member 336F so that a portion 322F' of the handle strap is visible. While portions of the handle strap 322 in any of the embodiments may be narrower than the opening 325 in the top panel, to prevent friction or damage between the layers upon deployment, in this case the portion 322F' of the handle strap may be sufficiently narrower than the grip member 336F (see FIG. 36), or the cut away portion of the top panel 312, so that it is evident that handle strap 322F is a separate piece. When the handle is deployed as shown in FIG. 38, the portions of handle strap 322F; adjacent the grip member (but not initially showing through openings 325F) may become more visible as they are pulled upward with the grip member. Indicia (color, symbols, etc.) may be provided on grip member 336F and/or handle strap 322F, 322F', 322F".

Figure 39:
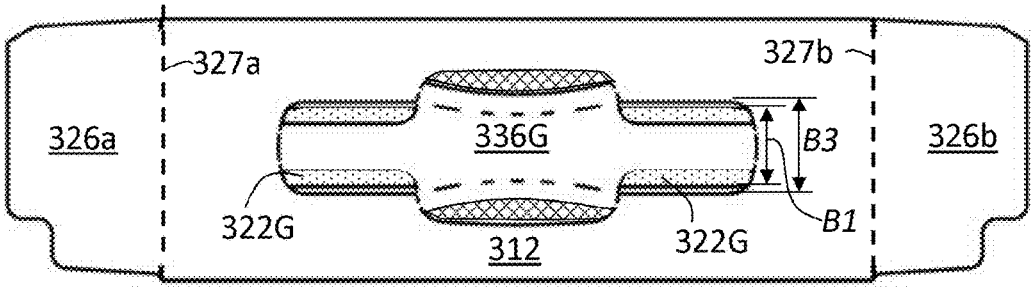
FIG. 39 is a view of the top panels of a tenth embodiment of a carton.
Figure 40:
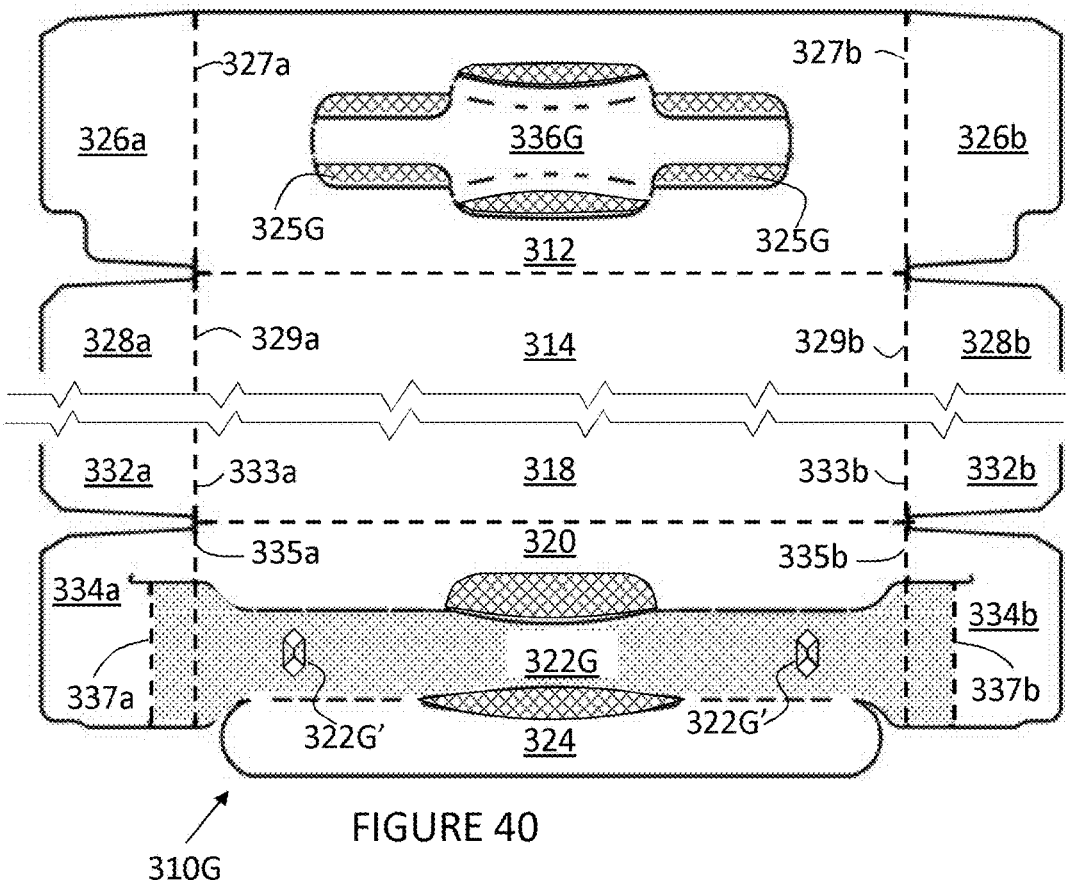
FIG. 40 is a plan view from above of a blank for forming the carton of FIG. 39.

FIG. 39 shows the top panels of a tenth carton 390G, and FIG. 40 shows the blank 310G from which carton 390G may be made. Openings 325G are provided (FIG. 40) that extend longitudinally along the outer edges of the ends of grip member 336G so that the user may see at least a portion of handle strap 322G through the openings (FIG. 39).

Figure 41:
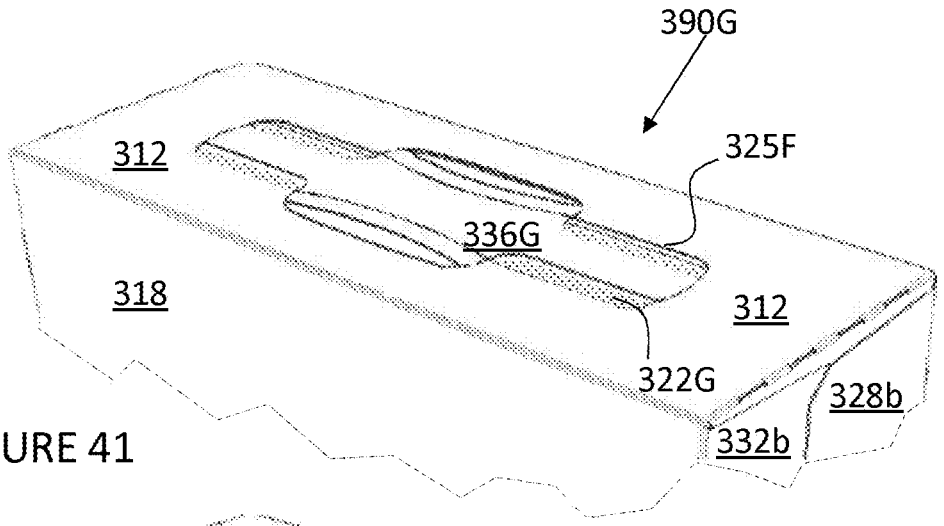
FIGS. 41-42 are perspective views from above of the carton of FIG. 39, with the handle in an as-manufactured configuration and a deployed configuration respectively.
Figure 42:
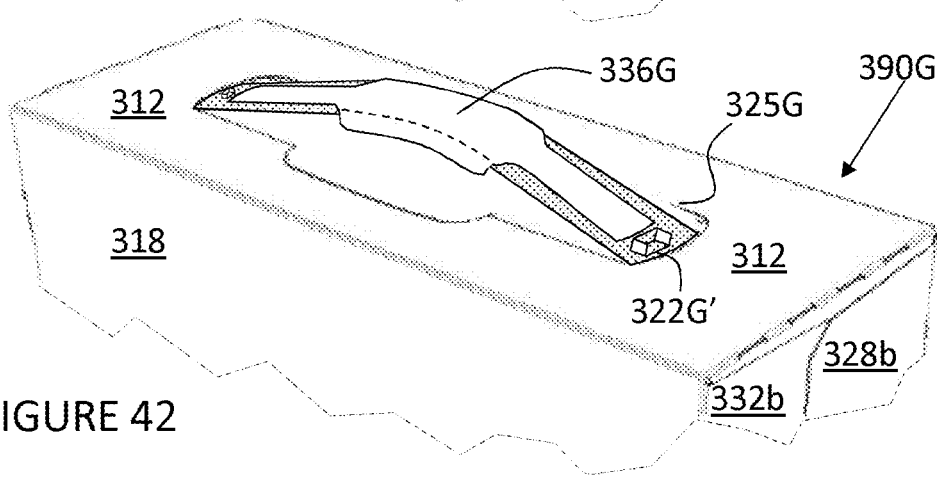

FIG. 41 shows carton 390G and particularly its grip member 336G before deployment. Portions of the top panel 312 are cut away along each side of grip member 336G at its ends so that portions 322G of the handle strap are visible. When the handle is deployed as shown in FIG. 42, additional area of handle strap 322G' adjacent the ends of grip member 336G becomes visible as the handle is pulled upward. Indicia (color, symbols, etc.) may be provided on grip member 336G and/or handle strap 322G, 322G'.

Figure 43:
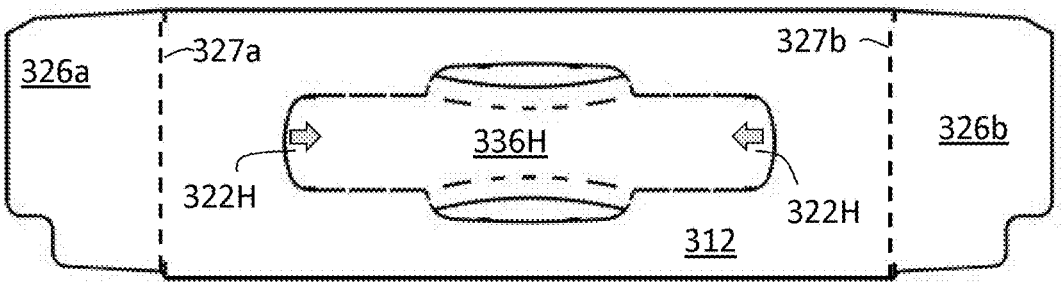
FIG. 43 is a view of the top panels of an eleventh embodiment of a carton.
Figure 44:
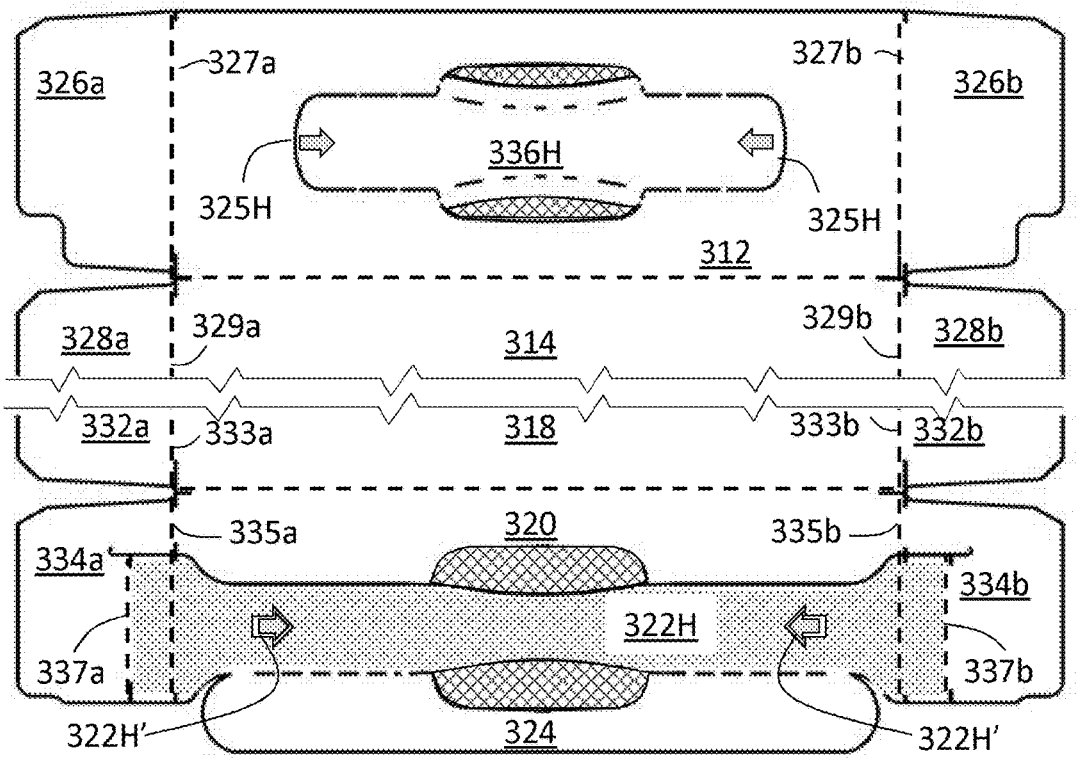
FIG. 44 is a plan view from above of a blank for forming the carton of FIG. 43.

FIG. 43 shows the top panels of an eleventh carton 390H, and FIG. 44 shows the blank 310H from which carton 390H may be made.

Figure 45:
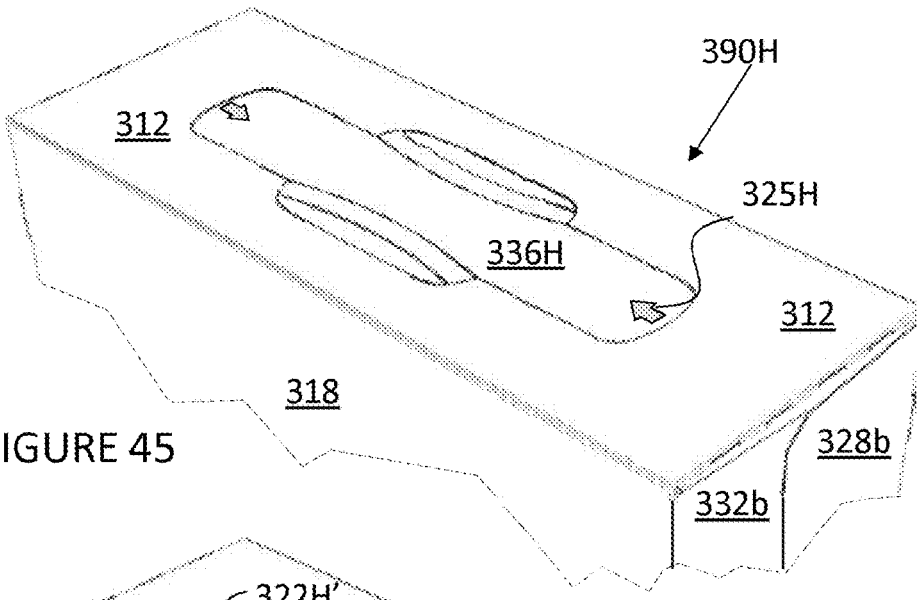
FIGS. 45-46 are perspective views from above of the carton of FIG. 43, with the handle in an as-manufactured configuration and a deployed configuration respectively.
Figure 46:
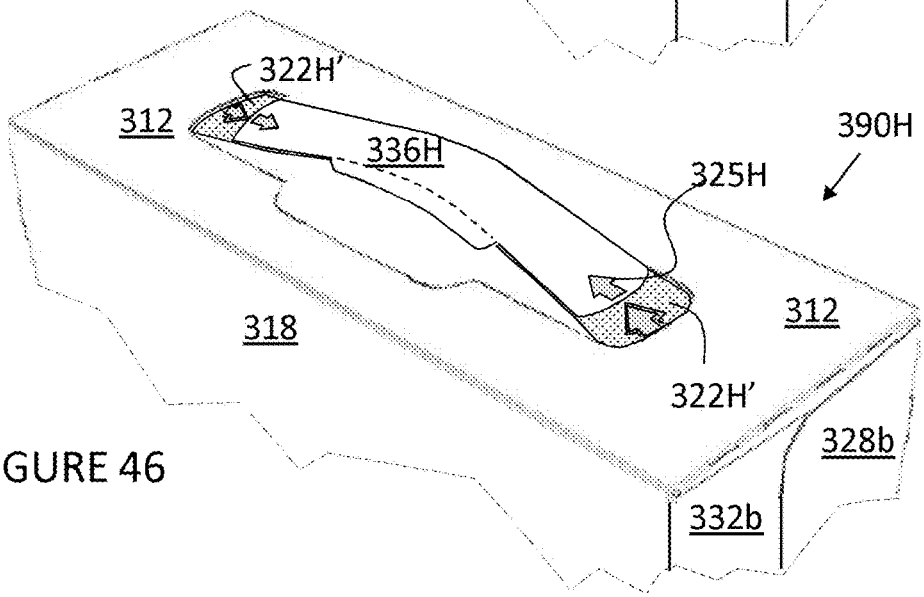

FIG. 45 shows carton 390H and particularly its grip member 336H before deployment. Indicia 325H may be provided on grip member 336H to indicate to the user that the end portions of the grip member will be pulled inward as the grip member 336H is lifted. When grip member 336H is deployed as shown in FIG. 46, the portions of handle strap 322H' adjacent the grip member 336H become visible as they are pulled upward with the grip member. Indicia such as logos, words, symbols, etc. may be provided on the grip member 336H and handle strap 322H, 322H' to provide directions, information, interesting facts, or other details.

With certain embodiments, the upward force exerted by the handle strap when it is lifted may tend to tear the top panel 312. FIGS. 47-52 show various methods that may be used to mitigate tearing of the top wall when the handle is deployed. The handle strap is considered to extended longitudinally, that is between opposed ends of the top panel. To mitigate tearing, a tear resisting line is provided that extends transversely at least partway across the top panel, and approximately perpendicular to the longitudinal extension of the handle strap.

Figure 47:
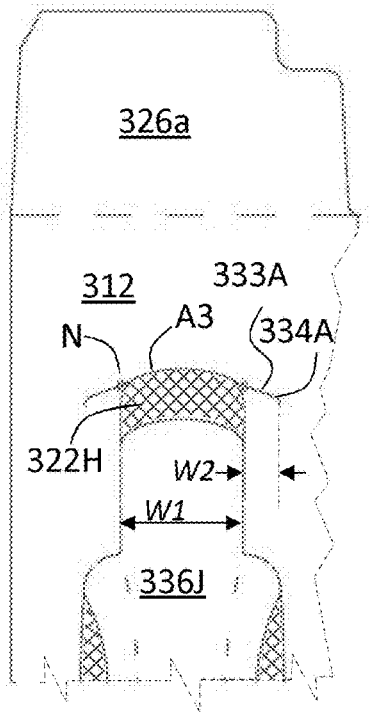
FIGS. 47-49 are top views from above of blanks with various tear-resisting features.

As shown on FIG. 47, the cut line 333A defining an outer edge of opening 322J (aperture A3) in top panel 312 may extend outward through to termination points 334A. The outward extensions may curve back toward the grip member. The termination points may be rounded or curved. The extended line may spread out the distance along which the upward force of the handle strap is exerted. The rounded termination points 334A may also help mitigate tearing, whether they are directed back toward the center of the handle 336J as shown in FIG. 47, or out toward the end of the carton as shown with termination points 334B in FIG. 48. Cut line 333A may be substantially tangent to the aperture A3 as shown in FIG. 47, or may be slightly offset toward the grip member as shown with cut line 333B in FIG. 48. One or more nicks N may be provided in the extended lines. As denoted in FIG. 47, the extended line may extend outwardly from each side of opening 322J a distance w2. The distance w2 may be at least 10% greater than the width w1 of the opening 322J. The distance w2 may be at least 20% of w1, or at least 30% of w1.

Figure 48:
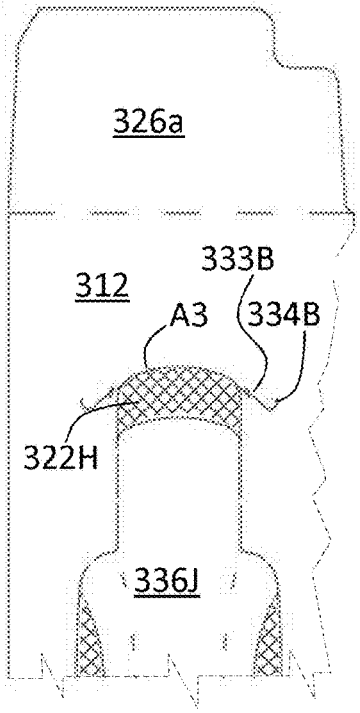

As shown in FIGS. 47 and 48, the sides of the aperture A3 may intersect the outer end of the opening in a curved or tangential fashion. Alternately as shown in FIG. 49, the sides of the aperture A3 may extend as straight lines until they intersect cut line 333C which ends at termination point 334C.

As shown on FIG. 47, the cut line 333A defining an outer edge of opening 322J (aperture A3) in top panel 312 may extend outward through to termination points 334A. The termination points may be rounded or curved. The extended line may spread out the distance along which the upward force of the handle strap is exerted. The rounded termination points 334A may also help mitigate tearing, whether they are directed back toward the center of the grip member 336J as shown in FIG. 47, or out toward the end of the carton as shown with termination points 334B in FIG. 48. Cut line 333A may be substantially tangent to the aperture A3 as shown in FIG. 47, or may be slightly offset toward the grip member as shown with cut line 333B in FIG. 48. One or more nicks N may be provided in the extended lines. As denoted in FIG. 47, the extended line may extend outwardly from each side of opening 322J a distance w2. The distance w2 may be at least 10% greater than the width w1 of the opening 322J. The distance w2 may be at least 20% of w1, or at least 30% of w1.

Figure 49:
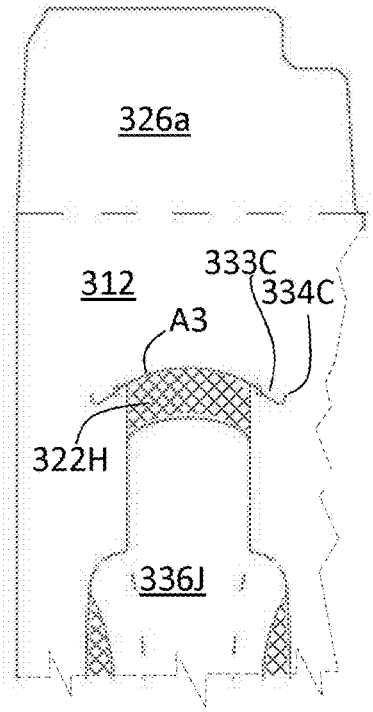
Figure 50:
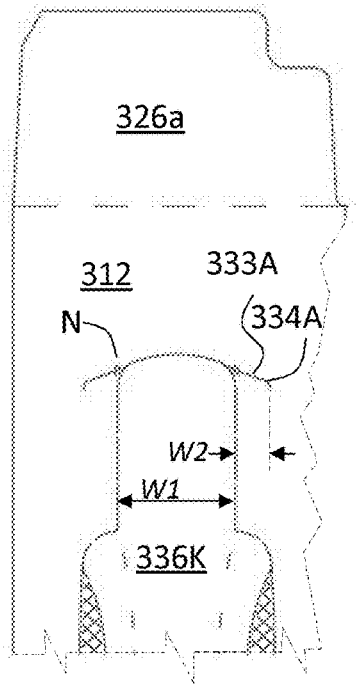
FIGS. 50-52 are top views from above of other blanks with various tear-resisting features.
Figure 51:
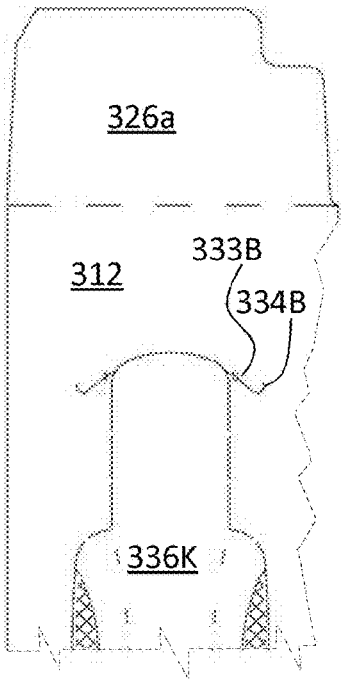
Figure 52:
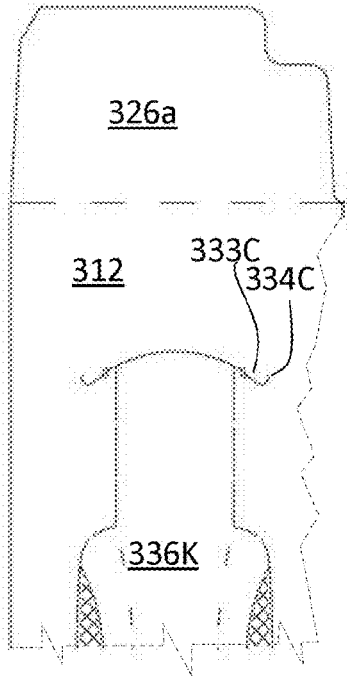

FIGS. 50-52 are similar to FIGS. 47-49, but are lacking aperture A3 beyond the end edge of grip member 336K. Thus the tear-mitigating features may be used whether or not aperture A3 is present. As seen in FIGS. 50 and 51, the sides of the ends of grip member 336K may intersect the cut line 333A, 333B defining the end of the grip member in a curved or tangential fashion. Alternately as shown in FIG. 52, the sides of the grip member 336K may extend as straight lines until they intersect cut line 333C defining the end of the grip member, which ends at termination point 334C. The outward extensions 333A, 333B, 333C may curve back toward the grip member. The termination points 334A, 334B, 334C may be curved and may extend toward the grip member 336J, or towards the ends of the carton.

Figure 53:
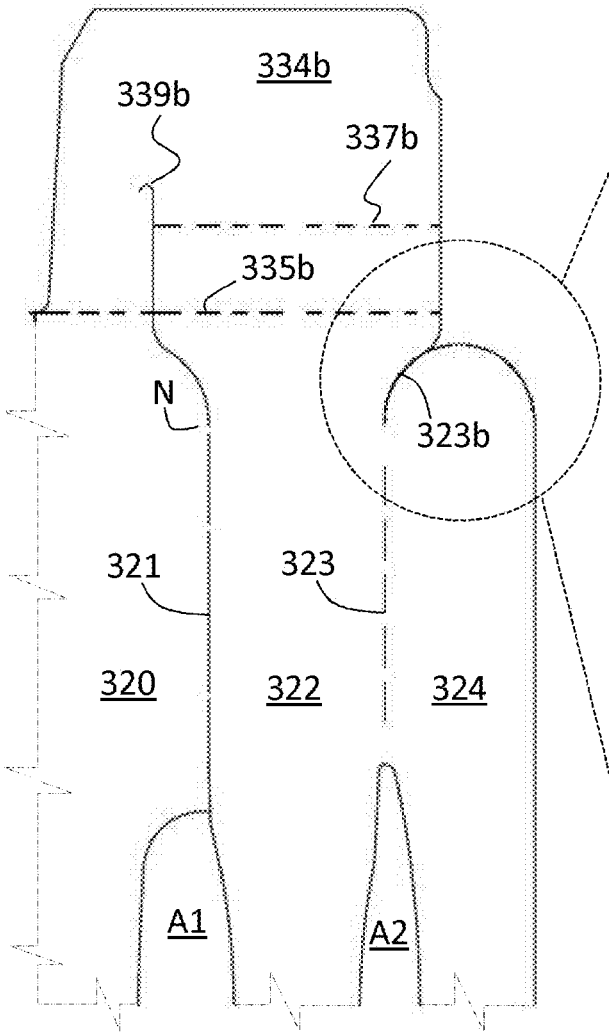
FIGS. 53-57 are plan views of certain details of a handle reinforcement for a carton.

FIGS. 53-57 illustrate various designs for the ends of handle reinforcement panels 324. As shown in FIG. 53, the end of separation line 321 extending into end panel 334b may terminate with a "J" or "C" shaped portion 339b to reduce any tendency toward tearing.

Figure 54:
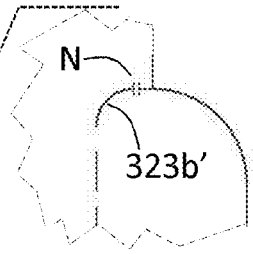

The cut line 323b between the end of handle reinforcement panel 324 and handle strap 322 may be a simple round cut between the parts. However, variations on this cut as shown in FIGS. 54-57 may be easier to manipulate with automated machinery when making the fold along fold line 323. FIG. 54 shows a cut line 323b' which extends perpendicular to fold line 323. One or more nicks N may be utilized with this or any of the designs.

Figure 55:
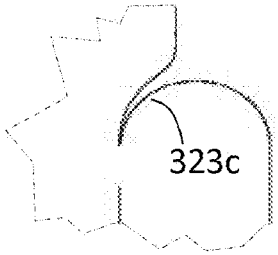
Figure 56:
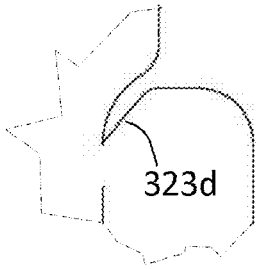
Figure 57:
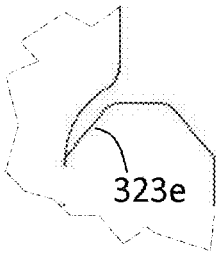

FIG. 55 shows a variation where the cut line 323c creates a gap between the end of handle reinforcement panel 324 and the adjacent part of handle strap 322. The bounding edge of the gap may be rounded as shown. The gap may be considered an arcuate cutaway as previously described with respect to elements R1, R2 in FIG. 6. FIGS. 56 and 57 show additional variations where the cut lines 323d, 323e include curved or straight edges. Again a gap is created between the end of the handle reinforcement panel 324 and the adjacent part of handle strap 322. This gap may be considered an arcuate cutaway even if portions of the cutaway are defined by non-curved edges.

It can be appreciated that various changes may be made within the scope of the present invention. For example, the size and shape of the panels and apertures may be adjusted to accommodate articles of differing size or shape.

It will be recognized that as used herein, directional references such as "top", "bottom", "base", "front", "back", "end", "side", "inner", "outer", "upper" and "lower" do not necessarily limit the respective panels to such orientation, but may merely serve to distinguish these panels from one another.

As used herein, the terms "hinged connection" and "fold line" each refer to all manner of lines that define hinge features of the blank, facilitate folding portions of the blank with respect to one another, or otherwise indicate optimal panel folding locations in the blank or substrate of sheet material. Any reference to "hinged connection" should not be construed as necessarily referring to a single fold line only; indeed, a hinged connection can be formed from one or more fold lines.

As used herein, the term "fold line" may refer to one of the following: a scored line, an embossed line, a debossed line, a line of perforations, a line of short slits, a line of half-cuts, a single half-cut, an interrupted cut line, aligned slits, a line of short scores and any combination of the aforesaid options, without departing from the scope of the invention.

As used herein, the terms "severance line" refers to all manner of lines formed in the blank of substrate that facilitate separating portions of the blank or substrate of sheet material from one another, or otherwise that indicate optimal separation locations on the blank or substrate. As used herein, the term "severance line" may refer to one of the following: a single half-cut, an interrupted cut, a score line, an interrupted score line, a line of perforations, a line of short cuts, a line of short slits, a line of short half cuts, and any combination of the aforementioned options.

It should be understood that hinged connection, fold lines and severance lines can each includes elements that are formed in the blank or substrate of sheet material, including perforations, a line of perforations, a line of short slits, a line of half-cuts, a single half-cut, a cut line, an interrupted cut line, slits, scores, any combination thereof, and the like. The elements can be dimensioned and arranged to provide the desired functionality. For example, a line of perforations can be dimensioned or designed with degrees of weakness to define a fold line and/or a severance line. The line of perforations can be designed to facilitate folding and resist breaking, to facilitate folding and facilitate breaking with more effort, or to facilitate breaking with little effort.

The phrase "in registry with" as used herein refers to alignment of two or more elements in an erected carton, such as an aperture formed in a first of two overlapping panels and a second aperture formed in a second of two overlapping panels. Those elements in registry with each other may be aligned with each other in the direction of the thickness of the overlapping panels. For example, when an aperture in a first panel is "in registry with" a second aperture in a second panel that is placed in an overlapping arrangement with the first panel, an edge of the aperture may extend along at least a portion of an edge of the second aperture and may be aligned, in the direction of the thickness of the first and second panels, with the second aperture.

As used herein the term "cutaway" refers to all manner of shapings, recesses, apertures, cuts, slots, holes and gaps which may be circular, rectangular, capsule shaped, irregular shaped and many other shapes that are pre-formed or pre-defined.

The invention claimed is:

1. A handle structure for a carton comprising:

a first top panel forming a top wall of the carton and having first and second opposed end edges;

a grip member struck from the first top panel, the grip member being severably connected to the first top panel by nick portions; and a handle strap disposed below the first top panel and extending between the first and second end edges;

wherein the grip member is mounted on the handle strap, the grip member having first and second opposed end edges, the first end edge of the grip member being disposed closer to the first end edge of the first top panel than to the second end edge of the first top panel, wherein an aperture is formed at least in part in the first top panel so as to define the first end edge of the grip member, the aperture being disposed at least in part between the first end edge of the grip member and the first end edge of the first top panel, and wherein the handle structure is in an initial configuration in which the grip member is in a plane defined by the first top panel and in which a first portion of the handle strap is exposed to view through the aperture, said first portion of the handle strap being disposed below the first top panel in the initial configuration.

2. The handle structure of claim 1, wherein the aperture extends to one of the end edges of the first top panel.

3. The handle structure of claim 2, further comprising an end closure panel which is hinged to the first top panel, the aperture extends to the one of the end edges of the first top panel and into the end closure panel.

4. The handle structure of claim 1, wherein the aperture extends along the first end edge of the grip member.

5. The handle structure of claim 1, wherein the handle structure is deployable to take a deployed configuration in which the grip member is lifted above the first top panel and in which a second portion of the handle strap is exposed to view through the aperture, the second portion being hidden from view by the first top panel when the handle structure takes the initial configuration.

6. The handle structure of claim 5, wherein the first portion of the handle strap is visually different from the second portion of the handle strap.

7. The handle structure of claim 6, wherein the first portion of the handle strap is different in color from the second portion of the handle strap.

8. The handle structure of claim 6, wherein the first portion of the handle strap has first indicia printed thereon, and the second portion of the handle strap has second indicia printed thereon, wherein the first and second indicia are different.

9. The handle structure of claim 8, wherein the first indicia are a question and the second indicia are an answer to the question.

10. The handle structure of claim 8, wherein the first indicia are a portion of an image and the second indicia are an adjoining portion of the image.

11. The handle structure of claim 1 wherein the aperture has a width, the first portion of the handle strap has a width, the width of the aperture is greater than the width of the first portion of the handle strap.

12. The handle structure of claim 1 wherein the grip member has a width, the handle strap has a width, and the width of the grip member is greater than the width of the handle strap.

13. The handle structure of claim 1, further comprising a second top panel disposed below the first top panel such that an inside surface of the first top panel is in face contacting relationship with an outer surface of the second top panel, and the handle strap is formed from part of the second top panel.

14. The handle structure of claim 13, wherein an outer surface of the handle strap is exposed to view through the aperture.

15. The handle structure of claim 14, wherein the outer surface of the handle strap in part is in face contacting relationship with the grip member and in part is exposed to view through the aperture.

16. A carton comprising a plurality of panels including a first top panel having first and second opposed end edges, and a handle structure for lifting the carton, the handle structure comprising:

a grip member struck from the first top panel and severably connected to the first top panel by nick portions, the grip member having first and second opposed end edges, the first end edge of the grip member being disposed closer to the first end edge of the first top panel than to the second end edge of the first top panel;

a handle strap extending between the first and second end edges of the first top panel, the handle strap being aligned with and located under the grip member; and an aperture struck at least in part from the first top panel so as to define the first end edge of the grip member, the aperture being disposed at least in part between the first end edge of the grip member and the first end edge of the first top panel, wherein the handle structure is in an initial configuration in which the grip member is in a plane defined by the first top panel and in which a first portion of the handle strap is exposed to view through the aperture, said first portion of the handle strap being disposed below the first top panel in the initial configuration.

17. The carton of claim 16, wherein the plurality of panels further includes a second top panel disposed below the first top panel, wherein an insider surface of the first top panel is in face contacting relationship with an outer surface of the second top panel, and the handle strap is formed from part of the second top panel.

18. The carton of claim 17, wherein an outer surface of the handle strap is exposed to view through the aperture.

19. The carton of claim 18, wherein the outer surface of the handle strap in part is in face contacting relationship with the grip member and in part is exposed to view through the aperture.

*20. A handle structure for a carton comprising:*

*a first top panel forming a top wall of the carton and having first and second opposed end edges;*

*a handle strap disposed below the first top panel and extending between the first and second end edges;*

*a grip member struck from the first top panel, the grip member being severably connected to the first top panel by nick portions, wherein the grip member is mounted on the handle strap, the grip member having first and second opposed end edges, the first end edge of the grip member being disposed closer to the first end edge of the first top panel than to the second end edge of the first top panel, wherein a first portion of the handle strap is disposed below the first top panel in an initial configuration;*

*a first indicia provided at least in part on the grip member to indicate to the user that the end edges of the grip member are configured to be pulled inward as the grip member is lifted, wherein the grip member and the first top panel are free from any apertures through which the handle strap is exposed to view; and*

*a second indicia provided at least in part on the handle strap that becomes visible as the handle strap is pulled upward as the grip member is lifted to give the user more confidence in the strength of the handle strap.*

*21. A carton comprising:*

*a plurality of panels including a first top panel having first and second opposed end edges, and a handle structure for lifting the carton, the handle structure comprising:*

*a grip member struck from the first top panel and severably connected to the first top panel by nick portions, the grip member having first and second opposed end edges, the first end edge of the grip member being disposed closer to the first end edge of the first top panel than to the second end edge of the first top panel;*

*a handle strap extending between the first and second end edges of the first top panel, the handle strap being aligned with and located under the grip member, wherein a first portion of the handle strap is disposed below the first top panel in an initial configuration;*

*a first indicia provided at least in part on the grip member to indicate to the user that the end edges of the grip member are configured to be pulled inward as the grip member is lifted, wherein the grip member and the first top panel are free from any apertures through which the handle strap is exposed to view; and*

*a second indicia provided at least in part on the handle strap that becomes visible as the handle strap is pulled upward as the grip member is lifted to give the user more confidence in the strength of the handle structure.*

*22. A handle structure for a carton comprising:*

*a first top panel forming a top wall of the carton and having first and second opposed end edges;*

*a grip member struck from the first top panel, the grip member being severably connected to the first top panel by nick portions; and*

*a handle strap disposed below the first top panel and extending between the first and second end edges;*

*wherein the grip member is mounted on the handle strap, the grip member having first and second opposed end edges, the first end edge of the grip member being disposed closer to the first end edge of the first top panel than to the second end edge of the first top panel,*

*wherein an aperture is formed at least in part in at least one of the first top panel or the grip member, and wherein the handle structure is in an initial configuration in which the grip member is in a plane defined by the first top panel and in which a first portion of the handle strap is exposed to view through the aperture, said first portion of the handle strap being disposed below the first top panel in the initial configuration.*

*23. A carton comprising a plurality of panels including a first top panel having first and second opposed end edges, and a handle structure for lifting the carton, the handle structure comprising:*

*a grip member struck from the first top panel and severably connected to the first top panel by nick portions, the grip member having first and second opposed end edges, the first end edge of the grip member being disposed closer to the first end edge of the first top panel than to the second end edge of the first top panel;*

*a handle strap extending between the first and second end edges of the first top panel, the handle strap being aligned with and located under the grip member; and*

*an aperture struck at least in part from at least one of the first top panel or the grip member, wherein the handle structure is in an initial configuration in which the grip member is in a plane defined by the first top panel and in which a first portion of the handle strap is exposed to view through the aperture, said first portion of the handle strap being disposed below the first top panel in the initial configuration.*

*24. The handle structure of claim 1, wherein in the initial configuration the aperture is defined by a first edge and a second edge spaced apart from one another with a gap therebetween, wherein a first portion of the handle strap is exposed to view through the gap of the aperture in the initial configuration.*

*25. The carton of claim 16, wherein in the initial configuration the aperture is defined by a first edge and a second edge spaced apart from one another with a gap therebetween, wherein a first portion of the handle strap is exposed to view through the gap of the aperture in the initial configuration.*

*26. The handle structure of claim 20, wherein the handle structure is in the initial configuration in which the grip member is in a plane defined by the first top panel, wherein the grip member and the first top panel are free from any apertures through which the handle strap is exposed to view in the initial configuration.*

*27. The carton of claim 21, wherein the handle structure is in the initial configuration in which the grip member is in a plane defined by the first top panel, wherein the grip*

*member and the first top panel are free from any apertures through which the handle strap is exposed to view in the initial configuration.*

*28. The handle structure of claim 22, wherein in the initial configuration the aperture is defined by a first edge and a second edge spaced apart from one another with a gap therebetween, wherein a first portion of the handle strap is exposed to view through the gap of the aperture in the initial configuration.*

*29. The carton of claim 23, wherein in the initial configuration the aperture is defined by a first edge and a second edge spaced apart from one another with a gap therebetween, wherein a first portion of the handle strap is exposed to view through the gap of the aperture in the initial configuration.*

* * * * *